(12) United States Patent
Suzuki et al.

(10) Patent No.: US 8,878,800 B2
(45) Date of Patent: Nov. 4, 2014

(54) INFORMATION PROCESSING APPARATUS, INFORMATION PROCESSING METHOD, AND COMPUTER-READABLE STORAGE MEDIUM

(75) Inventors: Seiji Suzuki, Kanagawa (JP); Takuro Noda, Tokyo (JP); Ikuo Yamano, Tokyo (JP)

(73) Assignee: Sony Corporation, Tokyo (JP)

( * ) Notice: Subject to any disclaimer, the term of this patent is extended or adjusted under 35 U.S.C. 154(b) by 226 days.

(21) Appl. No.: 13/433,869

(22) Filed: Mar. 29, 2012

(65) Prior Publication Data

US 2012/0256963 A1    Oct. 11, 2012

(30) Foreign Application Priority Data

Apr. 6, 2011    (JP) .................. 2011-084127

(51) Int. Cl.
*G06F 3/041*    (2006.01)
*G06F 3/0488*    (2013.01)

(52) U.S. Cl.
CPC .......... *G06F 3/0416* (2013.01); *G06F 3/04883* (2013.01)
USPC .......................................... 345/173

(58) Field of Classification Search
CPC ................................... G06F 3/04845
USPC .......................................... 345/173
See application file for complete search history.

(56) References Cited

U.S. PATENT DOCUMENTS

2008/0036743 A1*    2/2008    Westerman et al. .......... 345/173

FOREIGN PATENT DOCUMENTS

JP    2009-157508    7/2009
JP    2010-108061    5/2010

* cited by examiner

*Primary Examiner* — William Boddie
*Assistant Examiner* — Sahlu Okebato
(74) *Attorney, Agent, or Firm* — Sherr & Jiang, PLLC

(57) ABSTRACT

A method is provided for generating a command for executing a process according to analyzed input data. The method comprises calculating a movement speed of a plurality of operating members based on input data corresponding to input operations of the operating members. The method further comprises analyzing the input data based on the movement speed. The method also comprises generating a command for executing a process according to the analyzed input data.

20 Claims, 19 Drawing Sheets

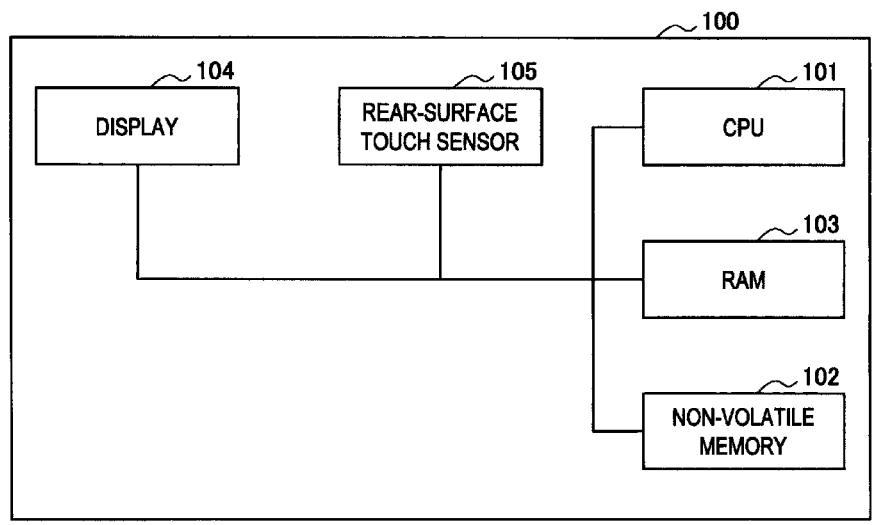
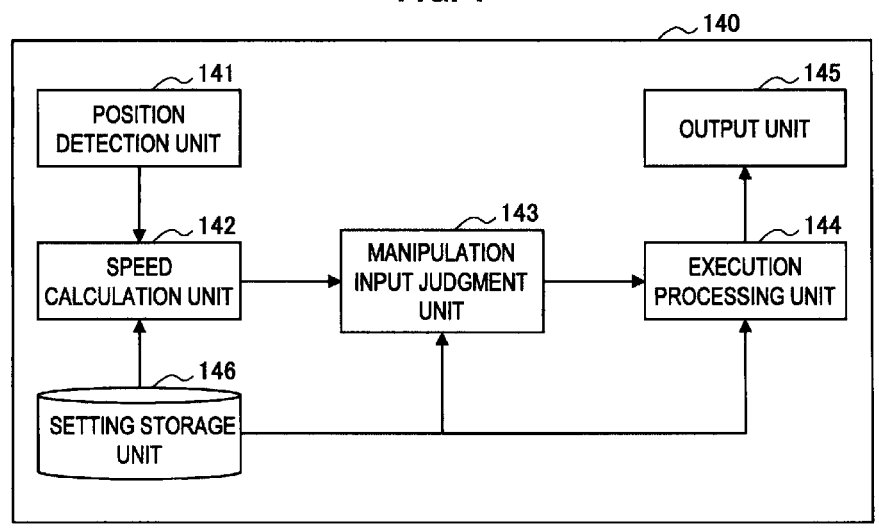

FIG. 12
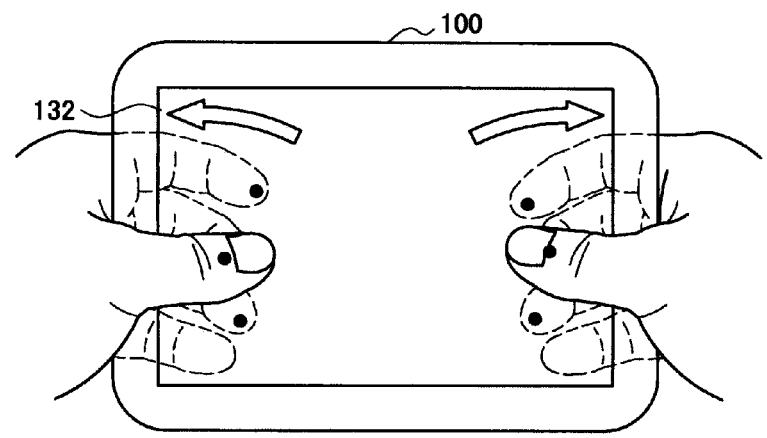
PINCH-OUT
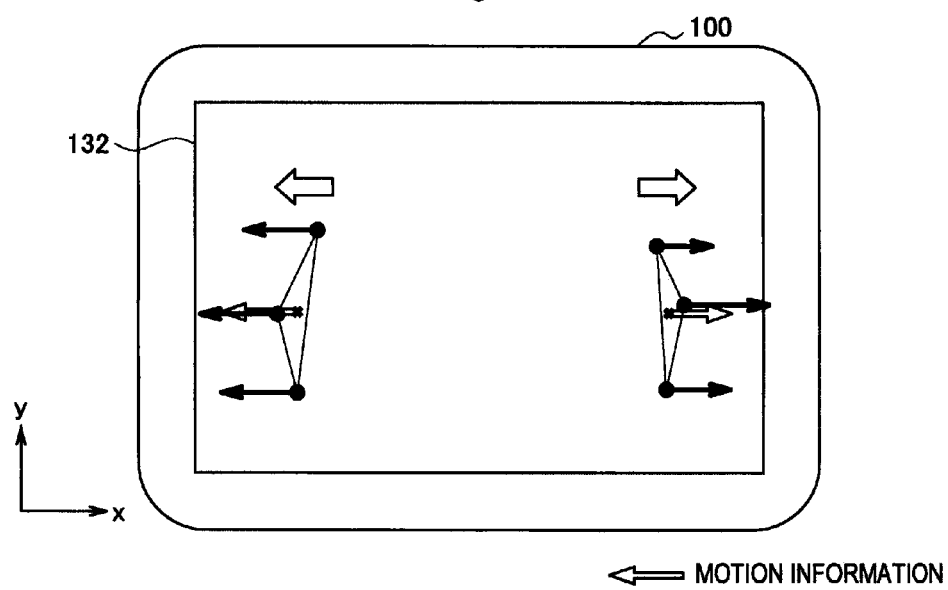
⇐ MOTION INFORMATION

FIG. 13
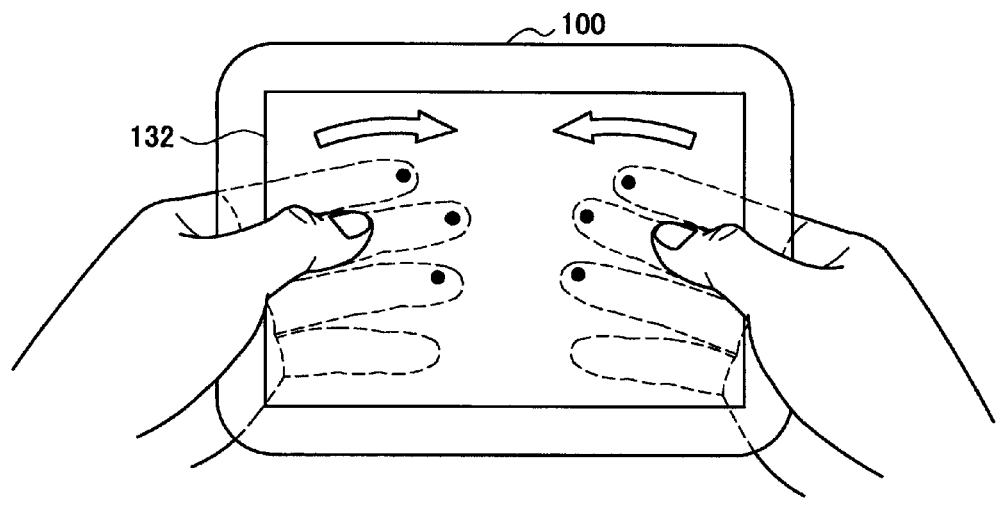
PINCH-IN
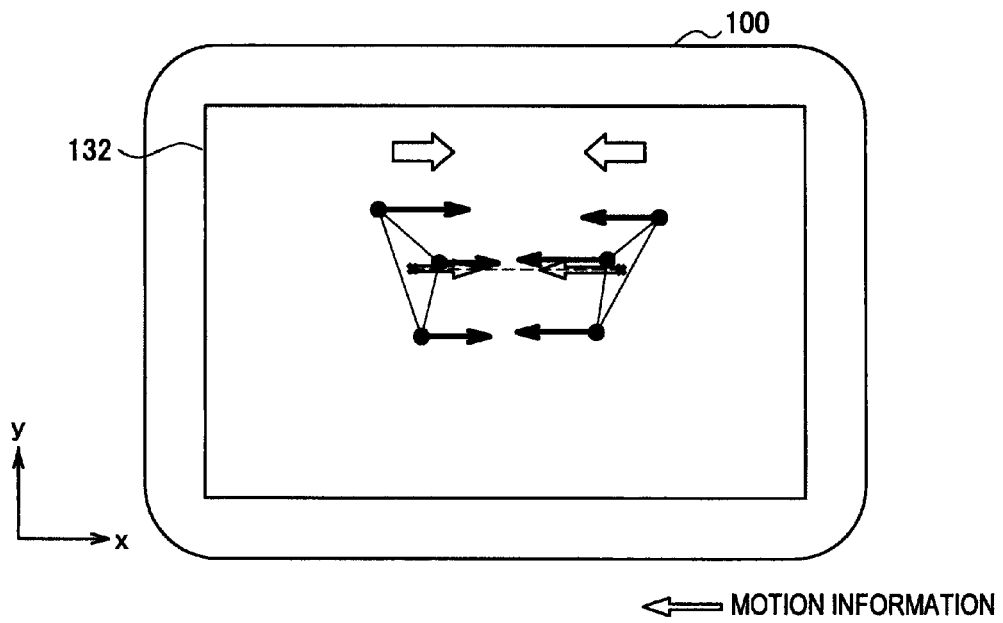
⇐ MOTION INFORMATION

INFORMATION PROCESSING APPARATUS, INFORMATION PROCESSING METHOD, AND COMPUTER-READABLE STORAGE MEDIUM

CROSS-REFERENCE TO RELATED APPLICATIONS

The present disclosure contains subject matter related to that disclosed in Japanese Priority Patent Application JP 2011-084128 filed in the Japan Patent Office on Apr. 6, 2011, the entire content of which is hereby incorporated by reference.

BACKGROUND

Description of the Related Art

The present disclosure relates to an information processing apparatus, an information processing method and a computer program, and more specifically, to an information processing apparatus including sensors for detecting positions of manipulation bodies performing manipulation inputs, an information processing method, and a computer program.

There are input devices, such as touch panels, using a sensor for detecting positions of manipulation bodies performing a manipulation input, as controllers of a GUI (Graphical User Interface) popularized as, for example, smart phones. In recent years, a touch panel capable of simultaneously detecting contact of a plurality of fingers, i.e., capable of detecting so-called multi-touch, is also becoming popular.

Further, as a device includes a plurality of sensors, an improved manipulation has been realized (e.g., Japanese Patent Laid-open Publication Nos. 2010-108061 and 2009-157908). With such a device, a manipulation input on the rear surface is enabled by providing, as a touch panel for detecting contact of a finger, one of the sensors on the opposite side (rear surface) of the display unit of the device, and the display screen will not be hidden by the finger even with a small device. Further, as a plurality of sensors are provided, intuitive interaction or an extended manipulation system, which was difficult to embody in touch panels according to a related art, can be realized.

Technical Problem

However, when a sensor for detecting contact of fingers is provided on the rear surface of the device, it is difficult for a user to view the sensor upon manipulation. Thereby, the user may unintentionally contact the sensor provided on the rear surface. As a result, a process is executed according to contact information detected by the device and a malfunction occurs.

Therefore, it is desirable to provide a novel and improved information processing apparatus, information processing method, and computer-readable storage medium capable of preventing such a malfunction.

SUMMARY

Accordingly, there is provided an apparatus for generating a command for executing a process according to analyzed input data. The apparatus comprises a speed calculation unit configured to calculate a movement speed of a plurality of operating members based on input data corresponding to input operations of the operating members. The apparatus further comprises a manipulation input analysis unit configured to analyze the input data based on the movement speed. The apparatus also comprises an execution unit configured to generate a command for executing a process according to the analyzed input data.

In another aspect, there is provided a method for generating a command for executing a process according to analyzed input data. The method comprises calculating a movement speed of a plurality of operating members based on input data corresponding to input operations of the operating members. The method further comprises analyzing the input data based on the movement speed. The method also comprises generating a command for executing a process according to the analyzed input data.

In another aspect, there is provided a tangibly embodied non-transitory computer-readable storage medium storing instructions which, when executed by a processor, cause a computer to perform a method for issuing a command for executing a process according to a selected input. The method comprises calculating a movement speed of a plurality of operating members based on input data corresponding to input operations of the operating members. The method further comprises analyzing the input data based on the movement speed. The method also comprises generating a command for executing a process according to the analyzed input data.

In yet another aspect, there is provided an apparatus for generating a command for executing a process according to analyzed input data. The apparatus comprises speed calculation means for calculating a movement speed of a plurality of operating members based on input data corresponding to input operations of the operating members. The apparatus further comprises manipulation input analysis means for analyzing the input data based on the movement speed. The apparatus also comprises execution means for generating a command for executing a process according to the analyzed input data.

According to the embodiments described above, there are provided an information processing apparatus, information processing method, and computer-readable storage medium, for preventing malfunction based on unintentional contact with a sensor.

BRIEF DESCRIPTION OF THE DRAWINGS

FIG. 3 is a block diagram illustrating one example of a hardware configuration of the information processing terminal according to the first embodiment;

FIG. 4 is a functional block diagram showing a functional configuration of the information processing apparatus according to the first embodiment;

FIG. 12 is an illustrative diagram showing a state in which a pinch-out manipulation is being performed;

FIG. 13 is an illustrative diagram showing a state in which a pinch-in manipulation is being performed;

DETAILED DESCRIPTION OF THE EMBODIMENT(S)

Figure 1:
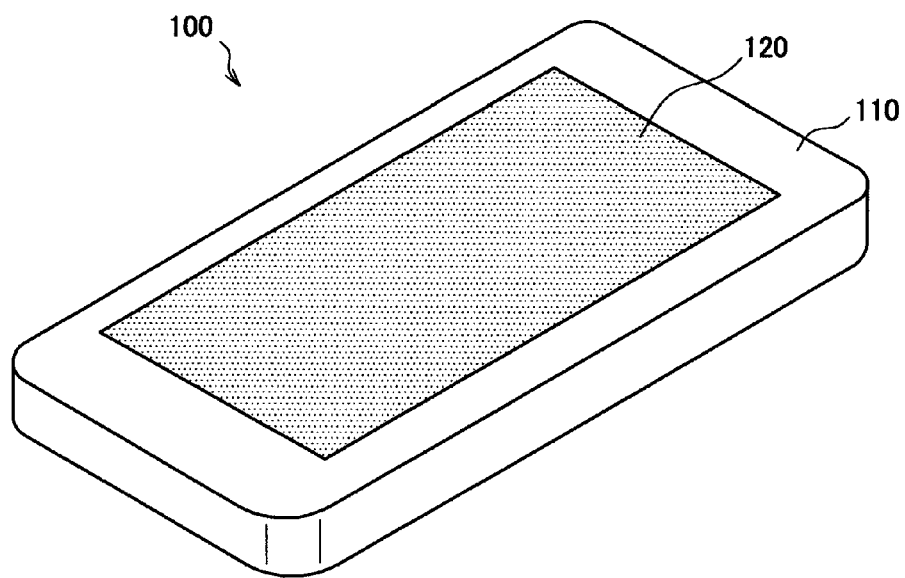
FIG. 1 is a schematic perspective view showing a display surface of an information processing terminal according to a first embodiment of this disclosure.

In the following, embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

It is to be noted that the description is set forth below in accordance with the following order.

1. First Embodiment (Judgment of Manipulation Input based on Movement Speed of Manipulation Body)
   1-1. Configuration of Information Processing Terminal
   1-2. Process in Information Processing Apparatus
   1-3. Others
2. Second Embodiment (Determination of Execution Process based on Priority)
   2-1. Configuration of Information Processing Terminal
   2-2. Process in Information Processing Apparatus
   2-3. Others
   <1. First Embodiment>
   [1-1. Configuration of Information Processing Terminal]
   (Example of Appearance of Information Processing Terminal)

Figure 2:
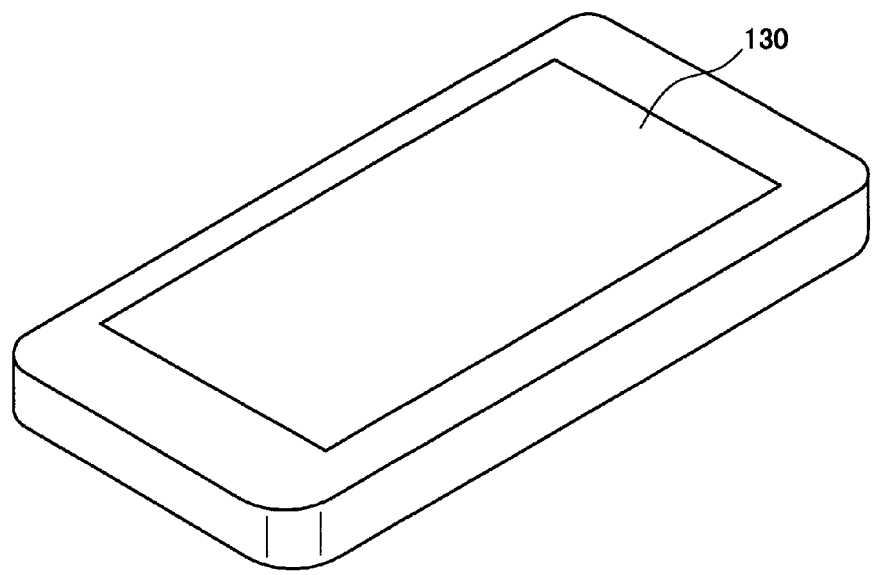
FIG. 2 is a schematic perspective view showing a rear surface of the information processing terminal according to the first embodiment.

First, a schematic configuration of an information processing terminal 100 according to an embodiment of the technology will be described with reference to FIGS. 1 and 2. FIG. 1 is a schematic perspective view showing a display surface of the information processing terminal 100 according to the present embodiment. FIG. 2 is a schematic perspective view showing a rear surface of the information processing terminal 100 according to the present embodiment.

In the information processing terminal 100 according to the present embodiment, a display unit 120 is provided on a surface (display surface) of a housing 110, and an input unit, such as touch sensor 130, capable of detecting contact of manipulation bodies (i.e., operating members) such as fingers is provided on a surface at an opposite side (rear surface) from the display surface. For example, a liquid crystal display or an organic EL display may be used as the display unit 120. Further, a capacitive touch sensor may be used as the touch sensor 130. Further, the information processing terminal 100 according to the present embodiment may also include a touch sensor (not shown) provided on the display surface, as in a second embodiment that will be described later.

(Example of Hardware Configuration)

The information processing terminal 100 according to the present embodiment may be embodied by a hardware configuration as shown in FIG. 3. FIG. 3 is a hardware configuration diagram showing one example of the hardware configuration of the information processing terminal 100 according to the present embodiment.

As shown in FIG. 3, the information processing terminal 100 according to the present embodiment includes a CPU 101, a tangibly embodied non-transitory computer readable storage medium, such as a non-volatile memory 102, a RAM (Random Access Memory) 103, a display 104, and a rear-surface touch sensor 105.

The CPU 101 functions as an arithmetic processing unit and a control device, and controls overall operation in the information processing apparatus 100 according to various instructions and programs. The CPU 101 may be a microprocessor. The non-volatile memory 102 stores instructions, programs, operation parameters, and the like used and executed by the CPU 101. For example, a ROM (Read Only Memory) or a flash memory may be used as the non-volatile memory 102. The RAM 103 temporarily stores programs used in execution of the CPU 101, parameters appropriately changed in the execution, and the like. These are connected to one another by a host bus including, for example, a CPU bus.

The display 104 is an example of an output device for outputting information. For example, a liquid crystal display (LCD) device, an OLED (Organic Light Emitting Diode) device, or the like can be used as the display 104.

The rear-surface touch sensor 105 is one of input devices that enable a user to input information, and is provided on a surface at an opposite side from the display surface of the display 104 of the information processing terminal 100 to detect contact of a manipulation body (i.e., operating member), such as a finger. For example, a capacitive touch panel for sensing contact of a manipulation body by detecting an electrical signal resulting from static electricity or a pressure sensitive touch panel for sensing contact of the finger by detecting a change in pressure on the rear surface may be used as the rear-surface touch sensor 105. The rear-surface touch sensor 105 includes, for example, an input unit for inputting information, and an input control circuit for generating an input signal based on a user input and outputting the input signal to the CPU 101.

While in the present embodiment, the touch sensor is provided on the rear surface at an opposite side of the display surface of the display 104, this technology does not limit the installation position of the touch sensor to such an example.

The touch sensor may be provided to be stacked on the display surface of the display 104 or may be provided on a side surface of the terminal.

(Functional Configuration of Information Processing Apparatus)

Figure 5:
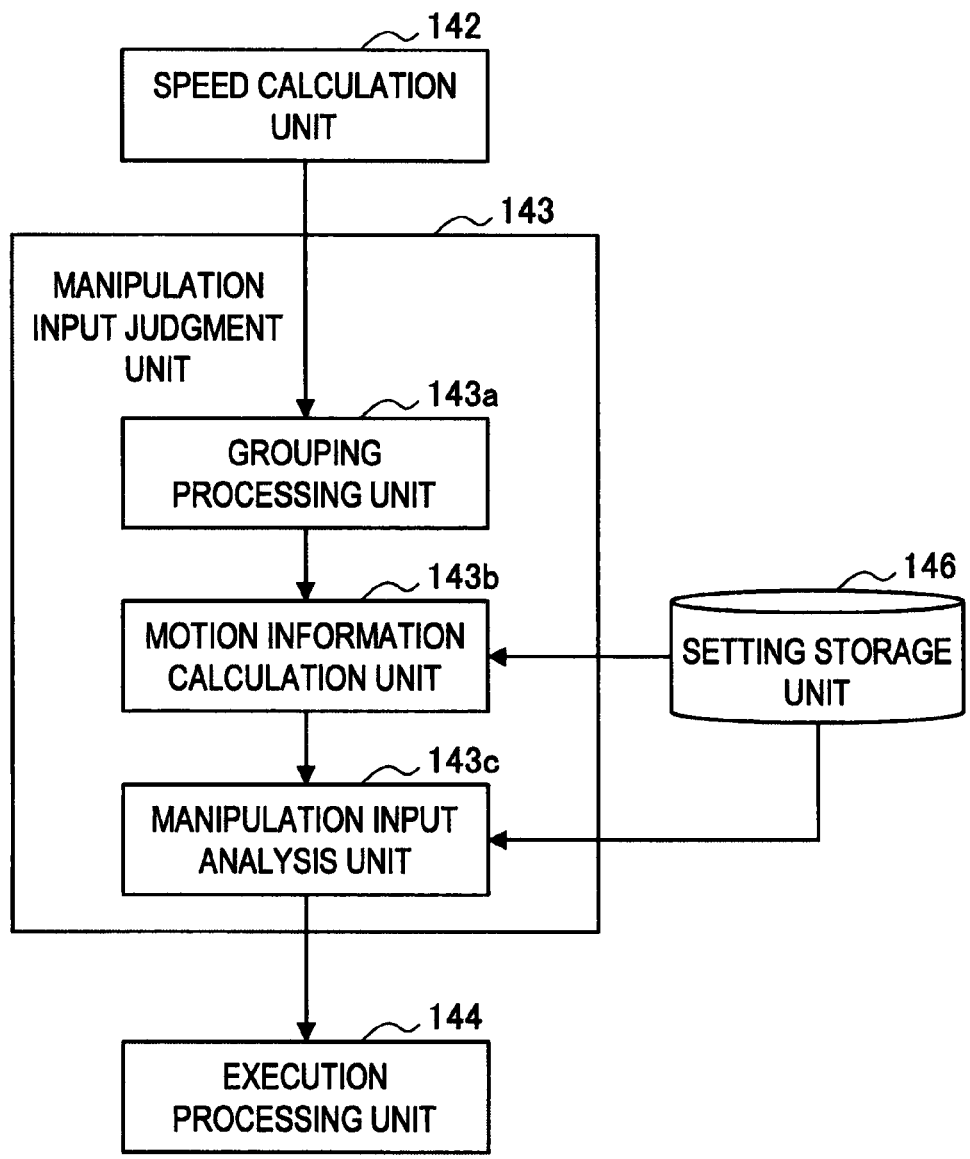
FIG. 5 is a functional block diagram showing a functional configuration of a manipulation input judgment unit according to the first embodiment.

Next, a functional configuration of the information processing apparatus 140 provided in the information processing terminal 100 according to the present embodiment will be described with reference to FIGS. 4 and 5. FIG. 4 is a functional block diagram showing a functional configuration of the information processing apparatus 140 according to the present embodiment. FIG. 5 is a functional block diagram showing a functional configuration of a manipulation input judgment unit 143 according to the present embodiment.

In the information processing terminal 100 according to the present embodiment, the rear-surface touch sensor 105 for detecting contact of the manipulation body with the rear surface is provided, as shown in FIGS. 1 to 3. This enables a manipulation input from the rear surface of the information processing terminal 100 to be performed and enables a user to perform the manipulation input while viewing the information displayed on the display 104. In this case, when the manipulation input is performed with the rear-surface touch sensor 105, the user may unintentionally contact the rear-surface touch sensor 105. The unintended contact is a cause of a malfunction. The information processing terminal 100 according to the present embodiment includes the information processing apparatus 140 for judging a manipulation body moving according to a user's intention and judging a manipulation input based on a motion of the manipulation body.

The information processing apparatus 140 includes a position detection unit (i.e., processing unit) 141, a speed calculation unit 142, the manipulation input judgment unit 143, an execution processing unit 144, an output unit 145, and a setting storage unit 146, as shown in FIG. 4. As used herein the term "unit" may be a software module, a hardware module, or a combination of a software module and a hardware module. Such hardware and software modules may be embodied in discrete circuitry, an integrated circuit, or as instructions executed by a processor.

The position detection unit 141 detects contact or input operations of the manipulation body with the information processing terminal 100. As shown in FIG. 3, the information processing terminal 100 according to the present embodiment includes the rear-surface touch sensor 105. The position detection unit 141 acquires position information of a finger on the rear surface from the rear-surface touch sensor 105. The position detection unit 141 acquires the detection result for the contact of the finger with the rear surface detected by the rear-surface touch sensor 105 every given time, and outputs a position of the finger in a detection area of the rear surface as position information to the speed calculation unit 142.

The speed calculation unit 142 calculates a movement speed of each finger based on the position information input from the position detection unit 141. The information processing apparatus 140 includes a memory (not shown) for managing a history of the position information of the finger detected by the position detection unit 141 every given time. The speed calculation unit 142 calculates the movement speed of the finger in contact with the rear surface based on the history of the position information of the finger, and outputs the movement speed to the manipulation input judgment unit 143.

Based on the movement speed of the finger, the manipulation input judgment unit 143 analyzes a motion of the finger in contact with the rear surface to judge the manipulation input. The manipulation input judgment unit 143 includes a grouping processing unit 143a, a motion information calculation unit 143b, and a manipulation input analysis unit 143c, as shown in FIG. 5.

The grouping processing unit 143a classifies the fingers whose contact with the rear surface has been detected by the position detection unit 141 into one or a plurality of groups based on a given grouping condition. In the information processing terminal 100 according to the present embodiment, since the manipulation input is performed from the rear surface of the terminal, a finger may contact the rear surface without the user's intention upon the manipulation input. In the information processing apparatus 140 according to the present embodiment, when a plurality of fingers contact the rear surface, fingers considered to be performing the same motion are classified by the grouping processing unit 143a and one group is considered one virtual finger. Accordingly, it is possible to prevent an erroneous manipulation caused by fingers being unintentionally in contact with the rear surface, thereby realizing a manipulation intended by the user. A detailed description of a grouping process of grouping the detected fingers will be described later. The grouping processing unit 143a outputs group information indicating the group to which each detected finger belongs, to the motion information calculation unit 143b.

The motion information calculation unit 143b calculates motion information indicating a motion of the groups, for example each group, based on the group information input from the grouping processing unit 143a. The motion information of the group is a movement speed of the group and position information of the group calculated from the movement speeds of the fingers included in the same group. A detailed description of a motion information calculation process will be described later. The motion information calculation unit 143b outputs the calculated motion information of each group to the manipulation input analysis unit 143c.

The manipulation input analysis unit 143c analyzes the manipulation input of the user based on the motion information of the groups, for example each group, input from the motion information calculation unit 143b. The manipulation input analysis unit 143c analyzes the manipulation input of the user based on, for example, the motion of any group or a motion relationship among a plurality of groups. Further, details of a manipulation input analysis process in the manipulation input analysis unit 143c will be described later. The manipulation input analyzed by the manipulation input analysis unit 143c is output to the execution processing unit 144.

Returning to the description of FIG. 4, the execution processing unit 144 generates and issues a command for executing a process according to the user manipulation input judged by the manipulation input judgment unit 143. Execution process information in which manipulation inputs are associated with issued commands is stored in the setting storage unit 146 that will be described later. The execution processing unit 144 issues a command corresponding to the manipulation input based on the execution process information stored in the setting storage unit 146. The process according to the command is executed in the information processing terminal 100.

The output unit 145 is a functional unit for outputting information in order to provide the information to the user. For example, the output unit 145 corresponds to the display 104 of FIG. 3. For example, a process in which display information of the display 104 is changed by the command issued by the execution processing unit 144 is performed. The output unit 145 may be, for example, a speaker for outputting sound, a vibration generation unit for generating vibration propagated to a user performing a manipulation input, or a lamp that is turned on or off, as well as the display 104.

The setting storage unit 146 is a storage unit for storing information necessary to perform command issuing according to the manipulation input. For example, the setting storage unit 146 corresponds to the non-volatile memory 102 or the RAM 103 in FIG. 3. For example, the group information or execution process information, speed or angle information (e.g., vth, θ1 or θ2) necessary for a grouping process that will be described later, time information (N) necessary for a flick manipulation judgment process, and the like are stored in the setting storage unit 146.

[1-2. Process in Information Processing Apparatus]

Figure 6:
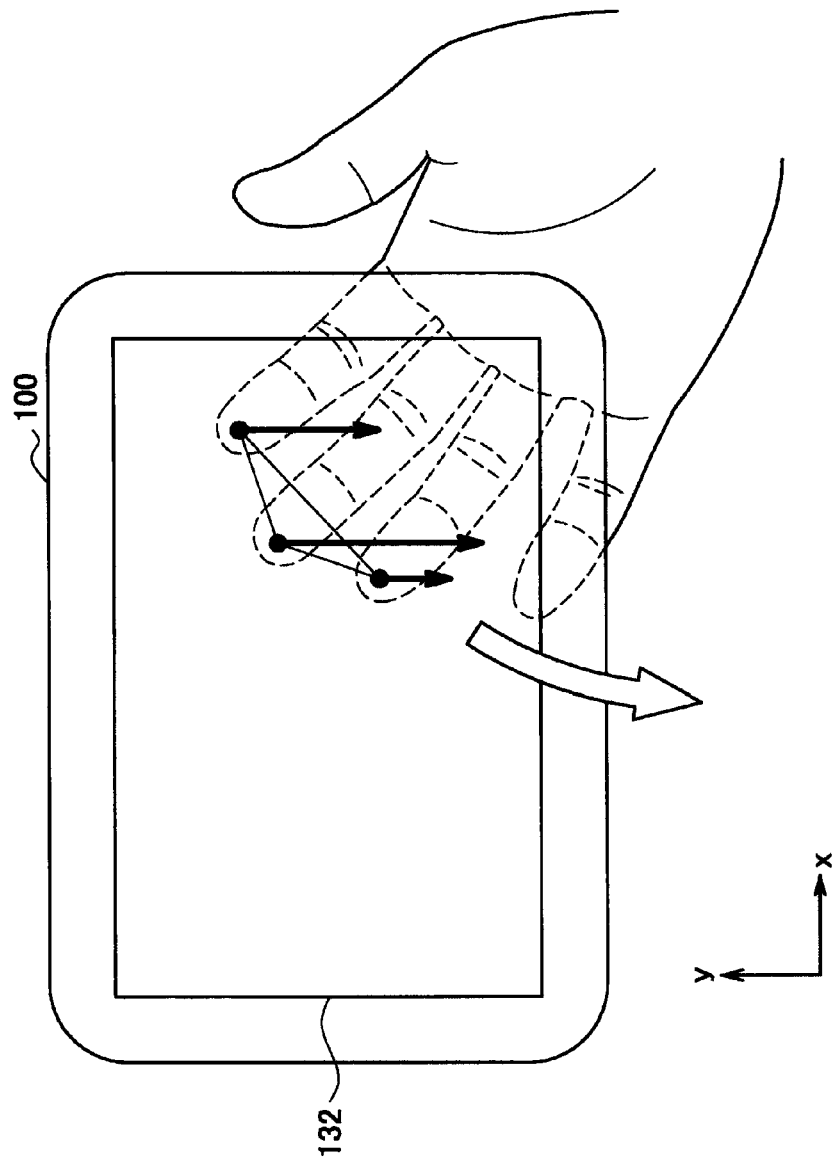
FIG. 6 is an illustrative diagram showing an example of a manipulation input on a rear surface.

The information processing terminal 100 according to the present embodiment can judge the manipulation input intended by the user based on the movement speed of each finger and issue the command according to the manipulation input by including the above-described information processing apparatus 140. For example, when a manipulation input to scroll or drag information displayed on the display surface of the display 104 is performed on the rear surface of the information processing terminal 100 as shown in FIG. 6, other fingers may be unintentionally brought into contact with the rear surface even when a manipulation input is performed with one finger. In this case, the information processing apparatus 140 according to the present embodiment groups fingers judged as moving in the same direction, thereby preventing an erroneous manipulation and realizing a manipulation intended by the user even when a plurality of fingers are easily brought into simultaneous contact, for example, as in a rear-surface manipulation.

Figure 7:
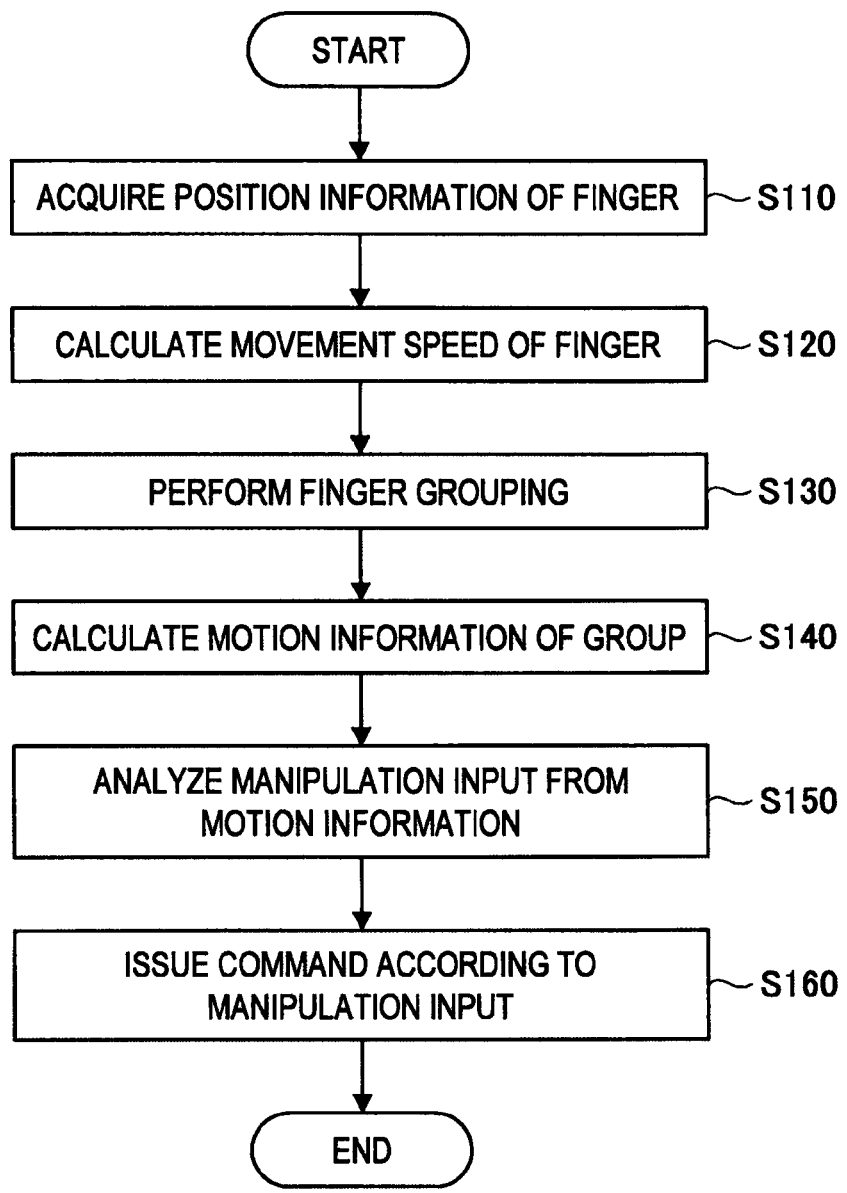
FIG. 7 is a flowchart showing information processing in the information processing apparatus according to the first embodiment.
Figure 8:
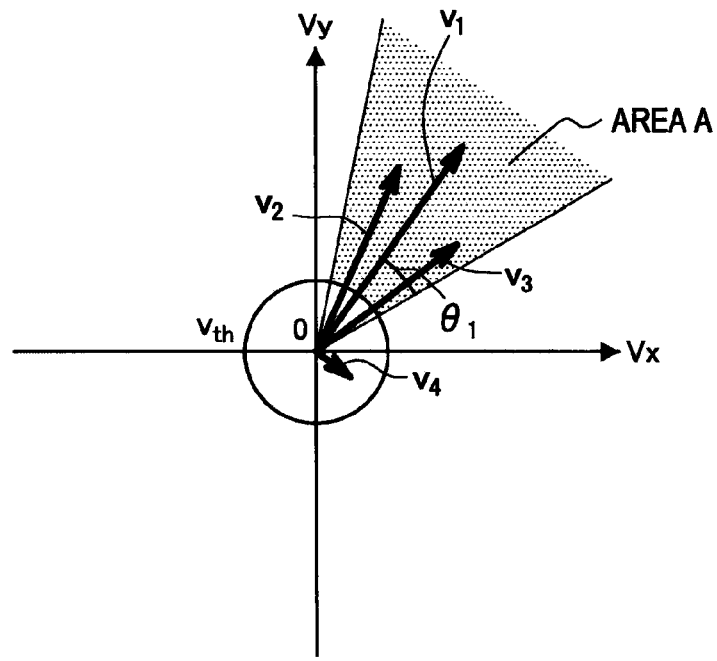
FIG. 8 is an illustrative diagram showing a state in which fingers moving in the same direction are classified into one group.
Figure 9:
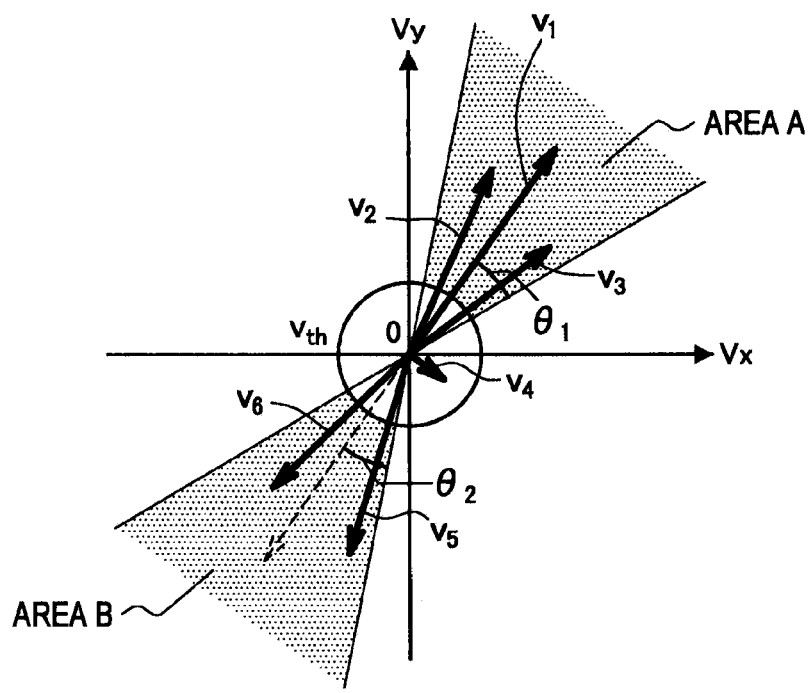
FIG. 9 is an illustrative diagram showing a state in which fingers moving in opposite directions are classified into two groups.
Figure 10:
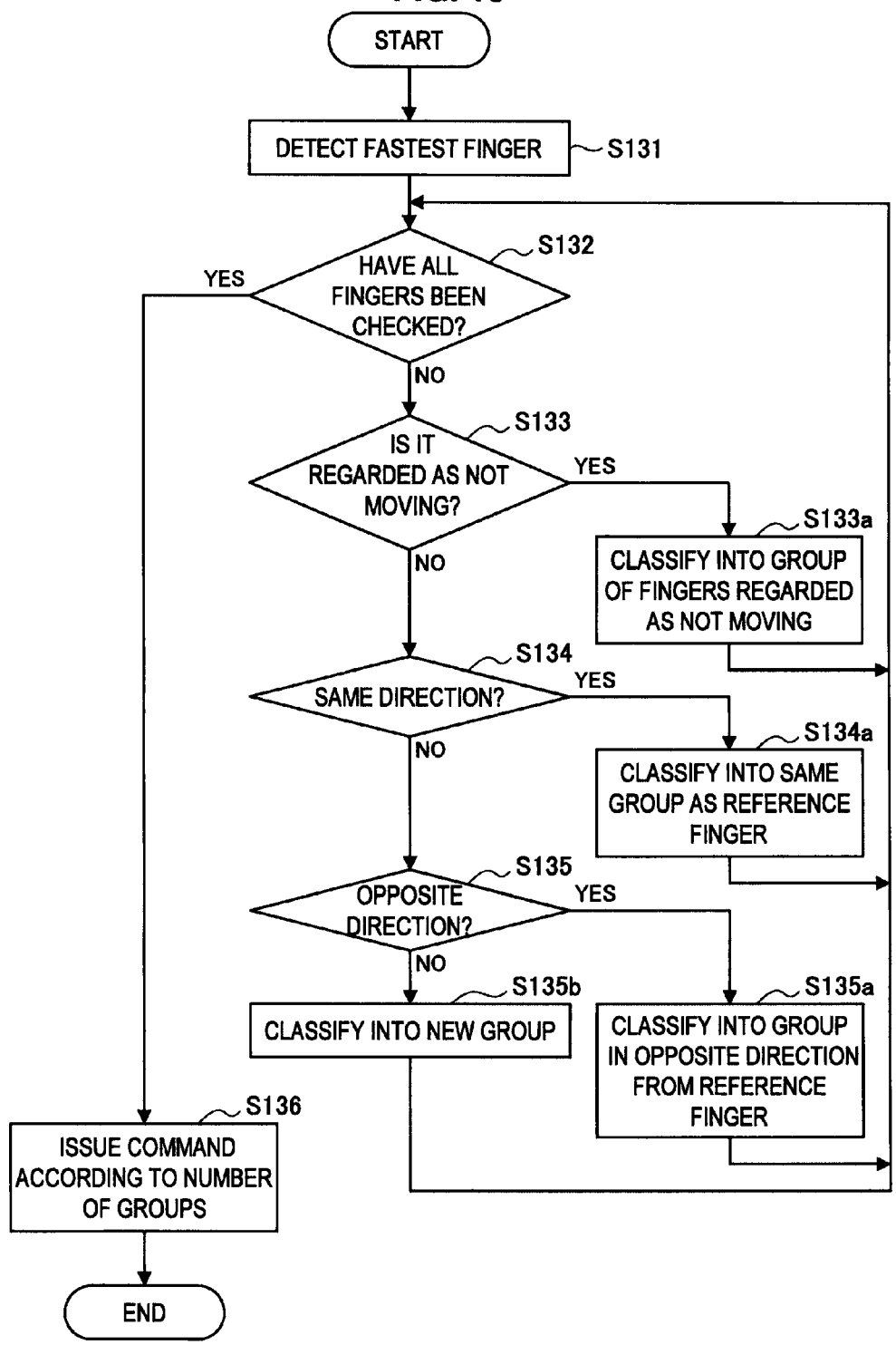
FIG. 10 is a flowchart showing a process of step S130 of FIG. 7.
Figure 11:
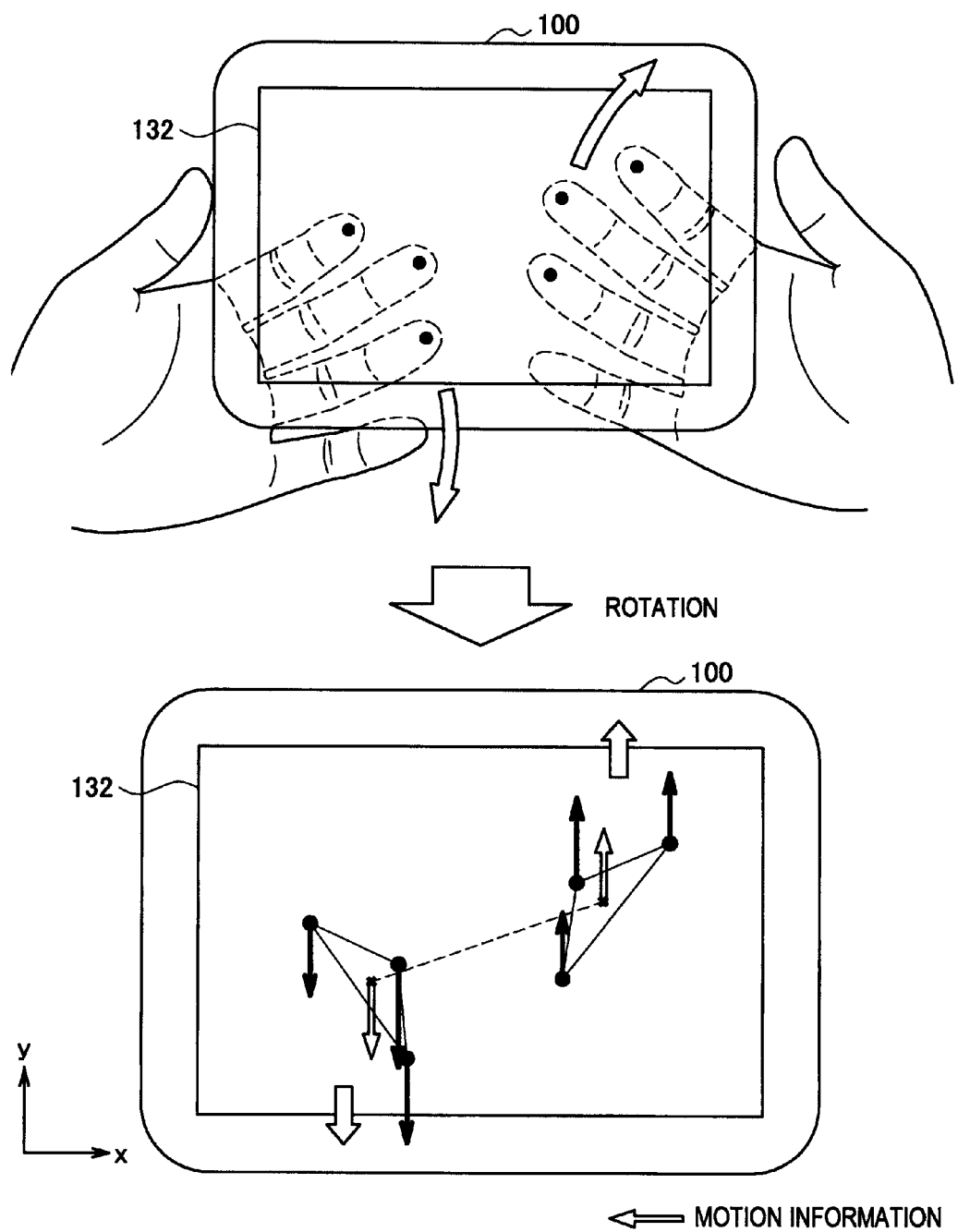
FIG. 11 is an illustrative diagram showing a state in which a rotation manipulation is performed.
Figure 14:
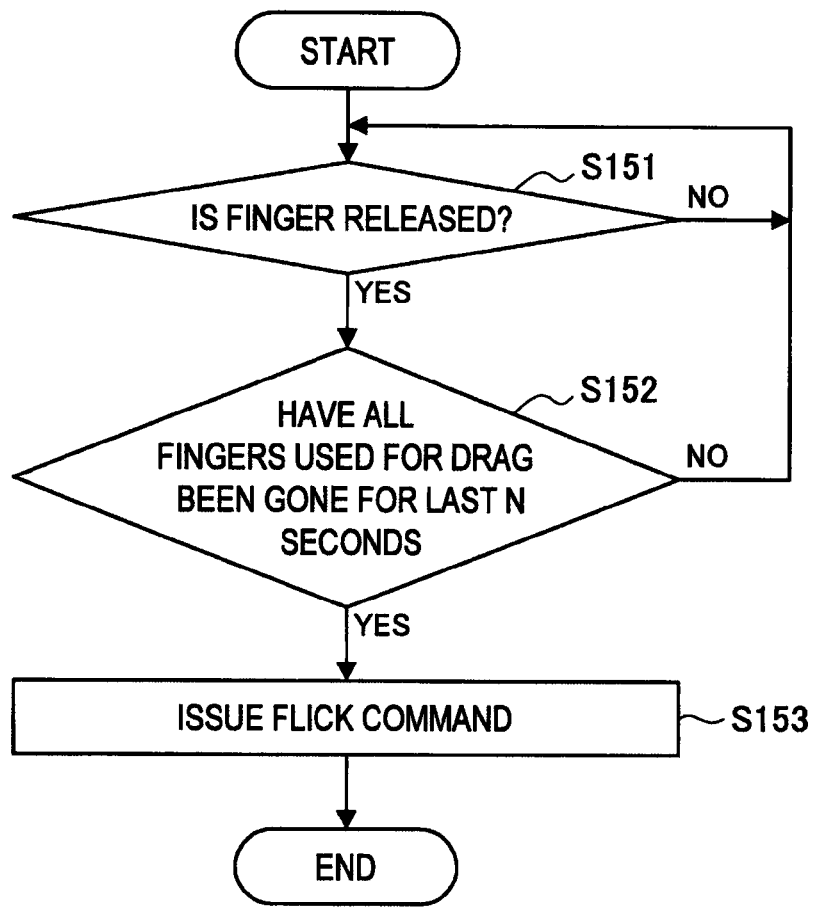
FIG. 14 is a flowchart showing a flick manipulation judgment process.

Hereinafter, information processing in the information processing apparatus 140 according to the present embodiment will be described in detail with reference to FIGS. 7 to 14. FIG. 7 is a flowchart showing information processing in the information processing apparatus 140 according to the present embodiment. FIG. 8 is an illustrative diagram showing a state in which fingers moving in the same direction are classified into one group. FIG. 9 is an illustrative diagram showing a state in which fingers moving in opposite directions are classified into two groups. FIG. 10 is a flowchart showing a process of step S130 of FIG. 7. FIG. 11 is an illustrative diagram showing a state in which a rotation manipulation is performed. FIG. 12 is an illustrative diagram showing a state in which a pinch-out manipulation (i.e., a zooming operation) is being performed. FIG. 13 is an illustrative diagram showing a state in which a pinch-in manipulation is being performed. FIG. 14 is a flowchart showing a flick manipulation judgment process.

As shown in FIG. 7, the information processing apparatus 140 according to the present embodiment first detects contact of the finger with the rear surface every given time using the position detection unit 141 (S110). If the contact of the finger is detected, the position information of the finger in the detection area is recorded in a memory (not shown) as a history. Next, the speed calculation unit 142 calculates a movement speed of each detected finger based on the position information stored in the memory (S120). The calculated movement speed of each finger is output to the manipulation input judgment unit 143.

It is to be appreciated that in certain embodiments information processing apparatus 140 may receive position information associated with an operating member from external devices, such as a device connected to a network, or from remote devices or servers in, for example, a cloud computing configuration. Upon receiving the position information from an external device, the position information may be recorded into a memory as a history, processed by the speed calculation unit 142, and output to the manipulation input judgment unit 143.

When the manipulation input judgment unit 143 receives an input of the movement speed of each finger from the speed calculation unit 142, the manipulation input judgment unit 143 first performs a process of grouping the detected fingers using the grouping processing unit 143a (S130). A finger grouping condition may be appropriately set. In the present embodiment, however, the finger having a maximum movement speed among the detected fingers is defined as a reference, and grouping is performed based on a relationship between a movement parameter of a finger that is the reference and other fingers.

More specifically, the grouping processing unit 143a groups the fingers based on association of the respective fingers obtained from the movement speeds calculated by the speed calculation unit 142. The finger association obtained from the movement speeds may be represented as, for example, an image shown in FIG. 8. In FIG. 8, the movement speeds of the fingers are represented as speed vectors, and start points of the speed vectors of the respective fingers match an origin 0. In FIG. 8, Vx indicates a speed in an x direction in an xy coordinate that specifies a position of a manipulation area shown in FIG. 6 and Vy indicates a speed in a y direction in the xy coordinate that specifies the position of the manipulation area shown in FIG. 6.

It can be seen from FIG. 8 that contacts of four fingers with the rear surface are detected since four speed vectors v1, v2, v3, and v4 are shown. In this case, the grouping processing unit 143a determines the vector v1 having a maximum movement speed among the four speed vectors v1, v2, v3, and v4 as a reference (hereinafter referred to as "reference vector"). When the reference vector has been determined, the grouping processing unit 143a specifies fingers that can be regarded as having a movement parameter in common with the reference vector, such as moving in the same direction as a finger corresponding to the reference vector (reference finger). The fingers regarded as moving in the same direction as the reference finger may be fingers moving in the same direction as a movement direction of the reference finger or may be fingers in an area within a given threshold angle ±θ1 from the reference vector. In the latter case, fingers corresponding to the speed vectors v2 and v3 in area A of FIG. 8 are regarded as moving in the same direction as the reference finger. Thus, the reference finger and the fingers regarded as moving in the same direction as the reference finger are classified into one group.

Moreover, fingers that lack a movement parameter in common with the reference finger can be excluded from a group. In FIG. 8, the speed vector v4 is not in area A, but a speed thereof is equal to or less than a given speed vth. vth is set to such a size that the finger is not considered to be intentionally moved. That is, vth is a value set to exclude a finger that is slightly moved unintentionally by the user from grouping targets. Fingers at this speed vth or less are regarded as fingers not moved irrespective of a movement direction, such that unintentionally moved fingers can be excluded when the manipulation input is judged and the manipulation input intended by the user can be more accurately judged.

The fingers excluded from the grouping target may include, for example, fingers whose area of contact with the rear surface is greater than a given area and fingers whose shape of contact of the finger with the rear surface is a given shape, as well as the fingers having a given speed or less. This is because a great contact area or, for example, a long and narrow contact shape may be considered as the user causing the fingers to be intentionally brought into strong contact in order to hold the information processing terminal 100. Further, when a sensor capable of detecting pressure on the rear surface is provided in the information processing terminal 100, a finger applying a pressure greater than a given pressure on the rear surface may be excluded from the grouping target. This is because such a finger may be considered as the user intentionally applying pressure on the terminal in order to hold the information processing terminal 100. With the exclusion of such a finger, it is possible to more accurately judge the manipulation input intended by the user.

When the reference vector has been determined, the grouping processing unit 143a specifies a finger that can be regarded as being related by a predetermined function to a corresponding movement parameter of the reference vector. For example, the grouping processing unit 143a specifies a finger moving in an opposite direction from the finger corresponding to the reference vector (reference finger). The finger regarded as moving in the opposite direction from the reference finger may be a finger moving in an opposite direction from a movement direction of the reference finger or may be a finger in an area within a given angle ±θ2 with respect to an opposite vector in an opposite direction from the reference vector. Further, the angle θ2 may be the same as or different from the angle θ1. In the latter case, fingers corresponding to the speed vectors v5 and v6 in area B of FIG. 9 are regarded as moving in the opposite direction from the reference finger. Thus, the fingers regarded as moving in the opposite direction from the reference finger are classified into one group.

A concrete process of step S130 is represented as a flowchart as shown in FIG. 10. When the movement speed of the finger whose contact has been detected has been calculated in step S120, a finger having the highest movement speed is detected by the grouping processing unit 143a (S131), as shown in FIG. 10. The finger is a reference finger. The grouping processing unit 143a judges whether all fingers have been grouped (S132). If there are fingers that are not grouped, the fingers are grouped through processes of steps S133 to S135 For example, the grouping processing unit 143a judges whether the finger is regarded as not moving from the movement speed of the finger (S133). In step S133, a judgment is made as to whether the speed of the finger is equal to or less than a given speed vth. If the speed of the finger is equal to or less than the given speed vth, the finger is classified into a group of fingers regarded as not moving (S133a) and the process returns to step S132.

On the other hand, if the speed of the finger is greater than the given speed vth, a judgment is made as to whether the finger is moving in the same direction as the reference finger (S134). In step S133, a judgment is made as to whether a speed vector indicating a motion of the finger is in area A within a given angle ±θ1 from the reference vector, as shown in FIG. 8. If it is judged that the motion vector of the finger is in area A, the finger is judged as moving in the same direction as the reference finger and classified into the same group as the reference finger (S134a). Then, the process returns to step S132 in which grouping of a new finger is performed. On the other hand, if it is judged that the motion vector of the finger is not in area A, a judgment is made as to whether the finger is moving in an opposite direction from the reference finger (S135).

In step S135, a judgment is made as to whether the speed vector indicating a motion of the finger is in area B within a given angle ±θ2 from an opposite vector in an opposite direction from the reference vector, as shown in FIG. 9. If it is judged that the motion vector of the finger is in area B, the finger is judged to be moving in the opposite direction from the reference finger and classified into a different group from the reference finger (S135a). Then, the process returns to step S132 in which grouping of a new finger is performed. On the other hand, if it is judged that the motion vector of the finger is not in area B, the finger is classified into a new group (S135b). Then, the process returns to step S132 in which grouping of a new finger is performed.

If it is judged in step S132 that there are no fingers that are not grouped, a command is issued according to the number of classified groups (S136). Since the process of step S136 corresponds to a process of steps S140 to S160 of FIG. 7 that will be described later, a detailed description thereof will be omitted for the moment.

Thus, the grouping processing unit 143a defines a finger having a maximum movement speed as a reference and groups other fingers according to a relationship between movement directions of the other fingers and a movement direction of the reference finger. Accordingly, fingers detected by the position detection unit 141 are classified into one or a plurality of groups.

When the respective fingers have been classified into the groups, the motion information calculation unit 143b calculates motion information of each group (S140). The motion information of the group is the movement speed of the group. The motion information may be calculated based on the movement speeds of the fingers belonging to the group. For example, the motion information calculation unit 143b calculates a centric coordinate from the position information of the fingers belonging to the group and defines the centric coordinate as the position information of the group. The motion information calculation unit 143b also calculates an average movement speed from the movement speeds of the fingers belonging to the group, and defines the average movement speed as a movement speed of the group. The motion information calculation unit 143b defines the position information of the group and the movement speed of the group as the motion information of the group. Thus, as the motion information of the group is calculated, the motion of the group can be represented by the average positions and the movement speeds of the fingers belonging to the group.

Alternatively, for example, the movement speed and the position information of the finger having the maximum movement speed upon initiation of the manipulation input among the fingers belonging to the group may be used as the motion information of the group. Since the finger having a high movement speed is considered to be intentionally moved by the user, the finger having a high movement speed may be treated as a representative of the group. As the motion of one finger is defined as the motion of the group to which the finger belongs, stable motion information can be acquired without being affected by motions of the other fingers belonging to the group.

The motion information of the group indicates the motion of the group, which can be regarded as a motion of one virtual finger. Thus, when a plurality of fingers are equally moving, a manipulation is regarded as a manipulation by one virtual finger, thereby preventing a judgment of an erroneous manipulation input due to a motion of a finger unintentionally contacting the rear surface. The motion information calculation unit 143b calculates the motion information of each group that can be divided through step S130.

Further, the manipulation input analysis unit 143c analyzes a user manipulation input based on the motion information of each group calculated in step S140 (S150). The manipulation input analysis unit 143c, for example, can specify a manipulation input based on the direction of the group from the motion information. For example, when only one group including fingers moving in the same direction is detected as shown in FIG. 6, it may be judged that a manipulation input to scroll information displayed on the display surface of the display 104 is being performed. Further, for example, when, two groups are detected, the manipulation input of the user can be judged according to positional relationships and movement parameters, e.g., direction, of the groups.

For example, as shown in an upper figure of FIG. 11, respective fingers of both hands are brought into contact with the rear surface of the information processing terminal 100 and the respective hands are moved in reverse directions (a positive direction of a y axis and a negative direction of the y axis in FIG. 11). In this case, the fingers in contact with the rear surface are classified into two groups based on movement speeds of the fingers by the grouping processing unit 143a, as shown in a lower figure of FIG. 11. That is, when the finger having a maximum movement speed is defined as a reference finger and the fingers are classified into a group moving in the same direction group as the reference finger and a group moving in an opposite direction, a group of fingers of the hand moving in the positive direction of the y axis and a group of fingers of the hand moving in the negative direction of the y axis are created, as shown in the lower figure of FIG. 11.

The manipulation input analysis unit 143c calculates positional relationships and movement directions of the groups from the motion information of the group, and analyzes a manipulation input performed by the user based on the setting information stored in the setting storage unit 146. A manipulation input estimated from a relationship between the motion information of the groups or the positional relationships of the groups and the movement directions is stored in the setting storage unit 146.

The positional relationship between a plurality of groups may be represented by a straight line connecting start points of motion information of the respective groups. The manipulation input analysis unit 143c according to the present embodiment specifies a manipulation input based on the movement direction of each group with respect to a direction of the straight line. For example, in the example shown in FIG. 11, the two groups move in a direction substantially orthogonal to a direction of the straight line connecting start points of motion information of the respective groups and also the two groups are moving in opposite directions. The manipulation input analysis unit 143c may judge that a rotation manipulation is performed based on the setting information stored in the setting storage unit 146. The rotation manipulation is an operation in which a manipulation target is rotated by two manipulation bodies. For example, the rotation manipulation may be used as a manipulation for issuing a command to rotate the information displayed on the display 104.

Further, for example, as shown in an upper figure of FIG. 12, fingers of both hands are brought into contact with the rear surface of the information processing terminal 100 and the respective hands are moved to be released in reverse directions (a positive direction of an x axis and a negative direction of the x axis in FIG. 12). Even in this case, as shown in a lower figure of FIG. 12, the fingers in contact with the rear surface are classified into two groups based on movement speeds of the fingers by the grouping processing unit 143a. The manipulation input analysis unit 143c calculates a positional relationship and movement directions of the groups from the motion information of the group and analyzes a manipulation input performed by the user, as in FIG. 11. In the example shown in FIG. 12, the two groups move in a direction substantially parallel to the direction of the straight line connecting start points of motion information of the respective groups, and also the two groups move to be released in opposite directions. The manipulation input analysis unit 143c may judge that a pinch-out manipulation is being performed based on the setting information stored in the setting storage unit 146.

Further, for example, as shown in an upper figure of FIG. 13, the fingers of both hands are brought into contact with the rear surface of the information processing terminal 100 and the respective hands are moved to be close in reverse directions (a positive direction of the x axis and a negative direction of the x axis in FIG. 13). Even in this case, as shown in a lower figure FIG. 13, the fingers in contact with the rear surface are classified into two groups based on movement speeds of the fingers by the grouping processing unit 143a. The manipulation input analysis unit 143c calculates the positional relationships and the movement directions of the groups from the motion information of the groups and analyzes a manipulation input performed by the user, as in FIG. 11. In the example shown in FIG. 13, the two groups move in a direction substantially parallel to the direction of the straight line connecting start points of the motion information of the respective groups, and also the two groups move to be close in opposite directions. The manipulation input analysis unit 143c may judge that a pinch-in manipulation is being performed based on the setting information stored in the setting storage unit 146.

Thus, in step S150, the positional relationship and the movement directions of the groups are calculated from the motion information of the group by the manipulation input analysis unit 143c, and the manipulation input performed by the user is judged.

Then, the execution processing unit 144 issues a command to execute a process corresponding to the user manipulation input judged in step S150 (S160). The execution processing unit 144 issues a command corresponding to the judged manipulation input based on execution process information in which manipulation inputs are associated with issued commands stored in the setting storage unit 146. For example, when the manipulation input is judged as a scroll manipulation from the motion information of one group of a plurality of fingers moving in the same direction as shown in FIG. 6, the execution processing unit 144 issues, for example, a command to scroll display information of the display 104 in the movement direction of the group.

Further, when the manipulation input is judged as a rotation manipulation, for example, as shown in FIG. 11, the execution processing unit 144 may issue a command to rotate the information displayed on the display 104. When the manipulation input is judged as a pinch-out manipulation, for example, as shown in FIG. 12, the execution processing unit 144 may issue a command to enlarge the information displayed on the display 104. When the manipulation input is judged as a pinch-in manipulation, for example, as shown in FIG. 13, the execution processing unit 144 may issue a command to reduce the information displayed on the display 104.

Thus, in step S160, the command to execute a process according to the judged manipulation input is issued by the process execution unit 144. The information processing terminal 100 executes a corresponding process according to the issued command.

Information processing in the information processing apparatus 140 of the information processing terminal 100 according to the present embodiment has been described above. In such a process, in order to judge the manipulation input intended by the user, the movement speeds of the fingers whose contact with the rear surface has been detected are calculated and fingers that perform a similar motion such as the same direction or an opposite direction from the calculated movement speeds are classified and grouped. Based on the motion information that is the movement speed of each group, the user manipulation input is judged and a command for executing a process according to the manipulation input is issued. Accordingly, it is possible to accurately judge the manipulation input intended by the user and prevent an erroneous manipulation.

[1-3. Others]

(Flick Manipulation Judgment Process)

Here, in step S150 of FIG. 7, the user manipulation input is judged by the manipulation input analysis unit 143c, for example, a judgment process such as the process shown in FIG. 14 is necessary to judge a flick manipulation by a plurality of fingers. When a drag manipulation is performed on the display surface of the display 104, a flick manipulation command is issued the moment one finger used for the drag manipulation is released, to thereby realize inertial scroll to cause the executed process to be continued by inertia. However, timing when the flick manipulation command is issued when the flick manipulation is performed on the rear surface with a plurality of fingers needs to have been determined.

In the present embodiment, when all finger used for drag are released from the rear surface, a flick manipulation command is issued, as shown in FIG. 14. For example, a drag manipulation is being performed by three fingers, as shown in FIG. 6. The fingers have been classified into the same group by the grouping processing unit 143a. If it is determined by the manipulation input analysis unit 143c that the drag manipulation is being performed based on this motion information of the group, the execution processing unit 144 issues a command for executing a process corresponding to the drag manipulation.

Then, the manipulation input analysis unit 143c judges whether at least one of the fingers belonging to the group has been released from the rear surface based on the detection result of the position detection unit 141 (S151). The manipulation input analysis unit 143c repeats the judgment in step S151 while the finger is not released from the rear surface. On the other hand, when any one finger is released from the rear surface, the manipulation input analysis unit 143c judges whether other fingers performing the drag manipulation together with the finger have remained in contact with the rear surface within the last N seconds (S152). If it is determined in step S152 that the other fingers have remained in contact with the rear surface, the process returns to step S151 in which the process is repeated. Thus, the process of step S152 is executed each time the finger is released from the rear surface.

When none of the other fingers performing the drag manipulation together with the finger released from the rear surface has remained in contact with the rear surface within the last N seconds in step S152, it is determined that the flick manipulation is performed and a corresponding command is issued (S153). Thus, the information processing apparatus 140 according to the present embodiment can judge that the flick manipulation is performed even when the flick manipulation is performed with a plurality of fingers and can issue a corresponding command, based on the process shown in FIG. 14.

(Grouping According to Proximity of Finger)

While, in the above description, grouping is performed based on the movement speeds of the fingers as shown in FIGS. 8 and 9, this technology is not limited to such an example. For example, grouping may be performed according to proximity of the finger from position information of the finger whose contact with the rear surface has been detected. Specifically, the grouping processing unit 143a may calculate distances of the respective fingers based on the position information of the fingers, and perform classification into the other group when a distance between any one finger and the other finger is equal to or more than a given distance.

Figure 15:
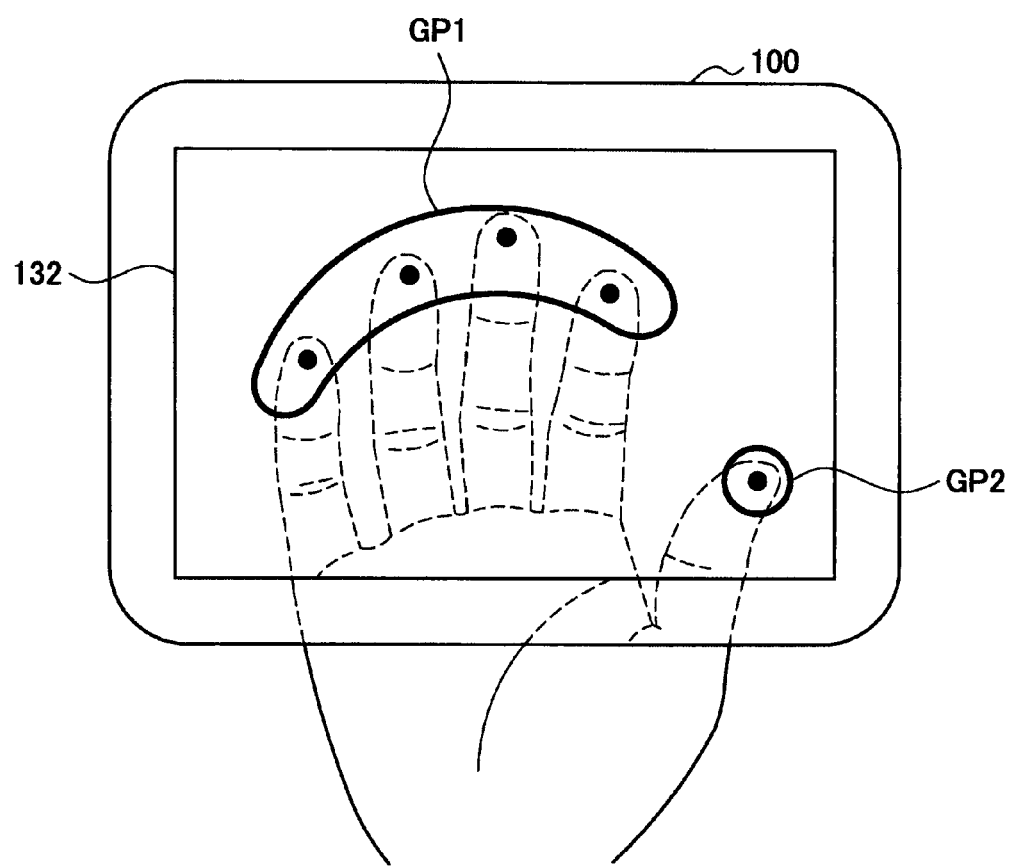
FIG. 15 is an illustrative diagram illustrating grouping based on proximity of a finger.

In a situation in which five fingers are in contact with the rear surface, for example, as shown in FIG. 15, the thumb is classified into a group GP2 that is different from a group GP1 of the other four fingers. It is possible to appropriately set whether grouping of the fingers is performed based on the movement speed of fingers, based on position information of fingers, or based on a combination of them according to, for example, the judged manipulation input.

<2. Second Embodiment>

Next, a configuration and a function of an information processing terminal 200 according to a second embodiment will be described with reference to FIGS. 16 to 22. The information processing terminal 200 according to the present embodiment differs from that according to the first embodiment in that the information processing terminal 200 includes a plurality of input units (e.g., touch-sensitive input units, or touch sensors) for detecting contact with the information processing terminal 200. Even when the information processing terminal 200 includes the plurality of touch sensors, it is easy for an erroneous manipulation to occur if the touch sensors are provided in positions that are easy for a user to unintentionally contact, as in the first embodiment. Thereby, in the information processing terminal 200 including the plurality of touch sensors, when manipulation inputs are simultaneously performed from the respective touch sensors, the manipulation input from the touch sensor that it is easy for the user to intentionally manipulate is preferentially executed.

Figure 16:
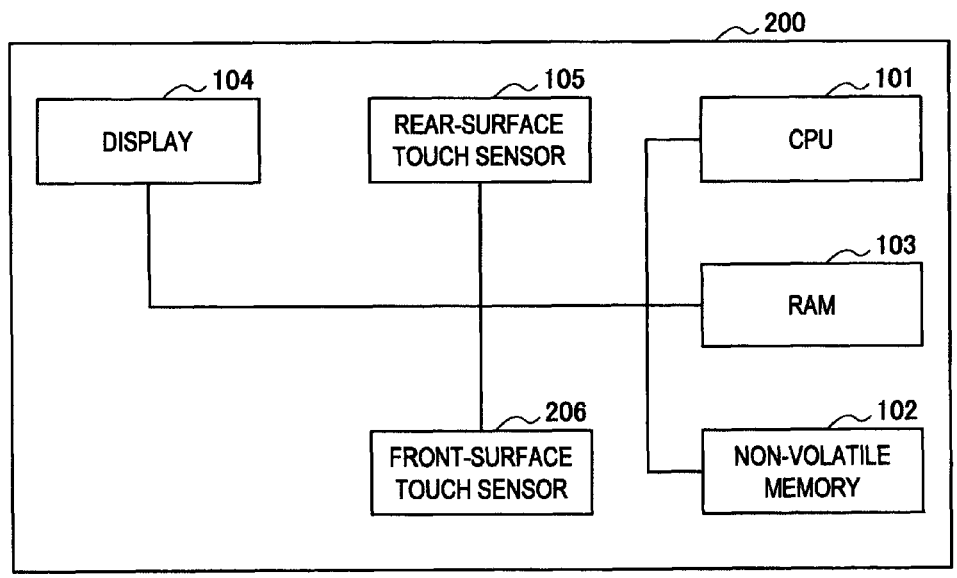
FIG. 16 is a block diagram illustrating one example of a hardware configuration of an information processing terminal according to a second embodiment of this disclosure.
Figure 17:
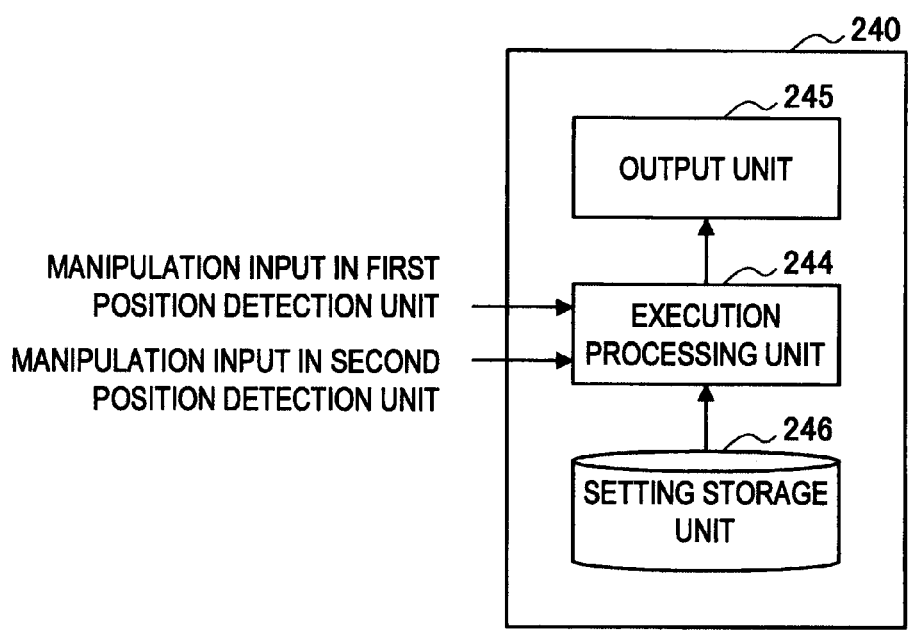
FIG. 17 is a functional block diagram showing a functional configuration of the information processing apparatus according to the second embodiment.
Figure 18:
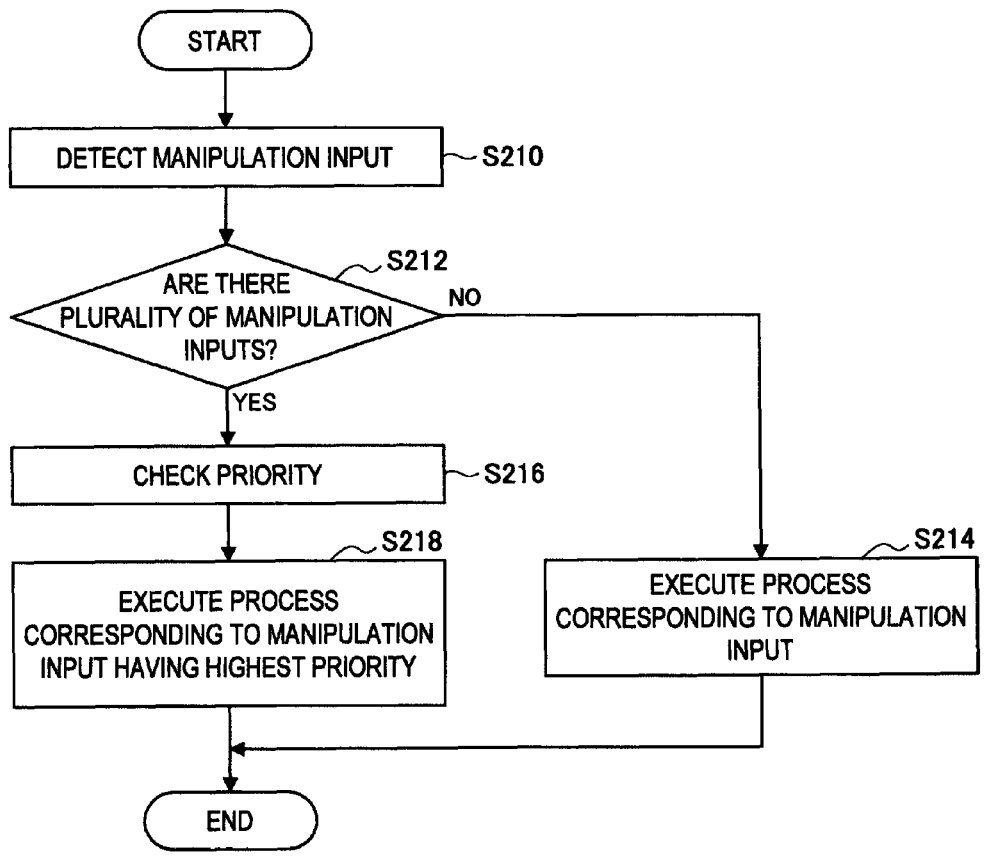
FIG. 18 is a flowchart showing a flow of an execution process determination based on a priority in an execution processing unit according to the second embodiment.
Figure 19:
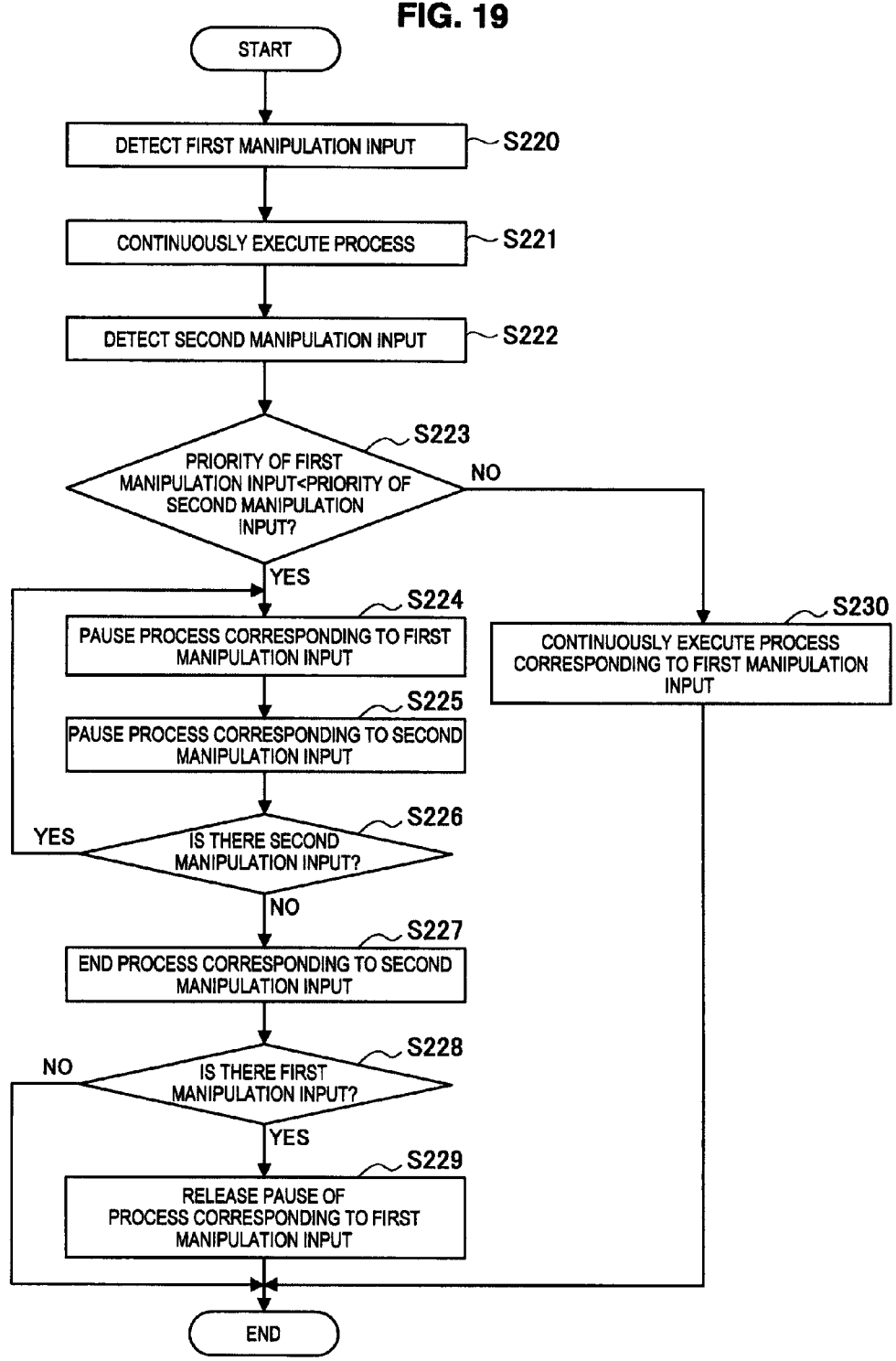
FIG. 19 is a flowchart showing a flow of an execution process determination based on a priority in the execution processing unit according to the second embodiment, in which the process is paused.
Figure 20:
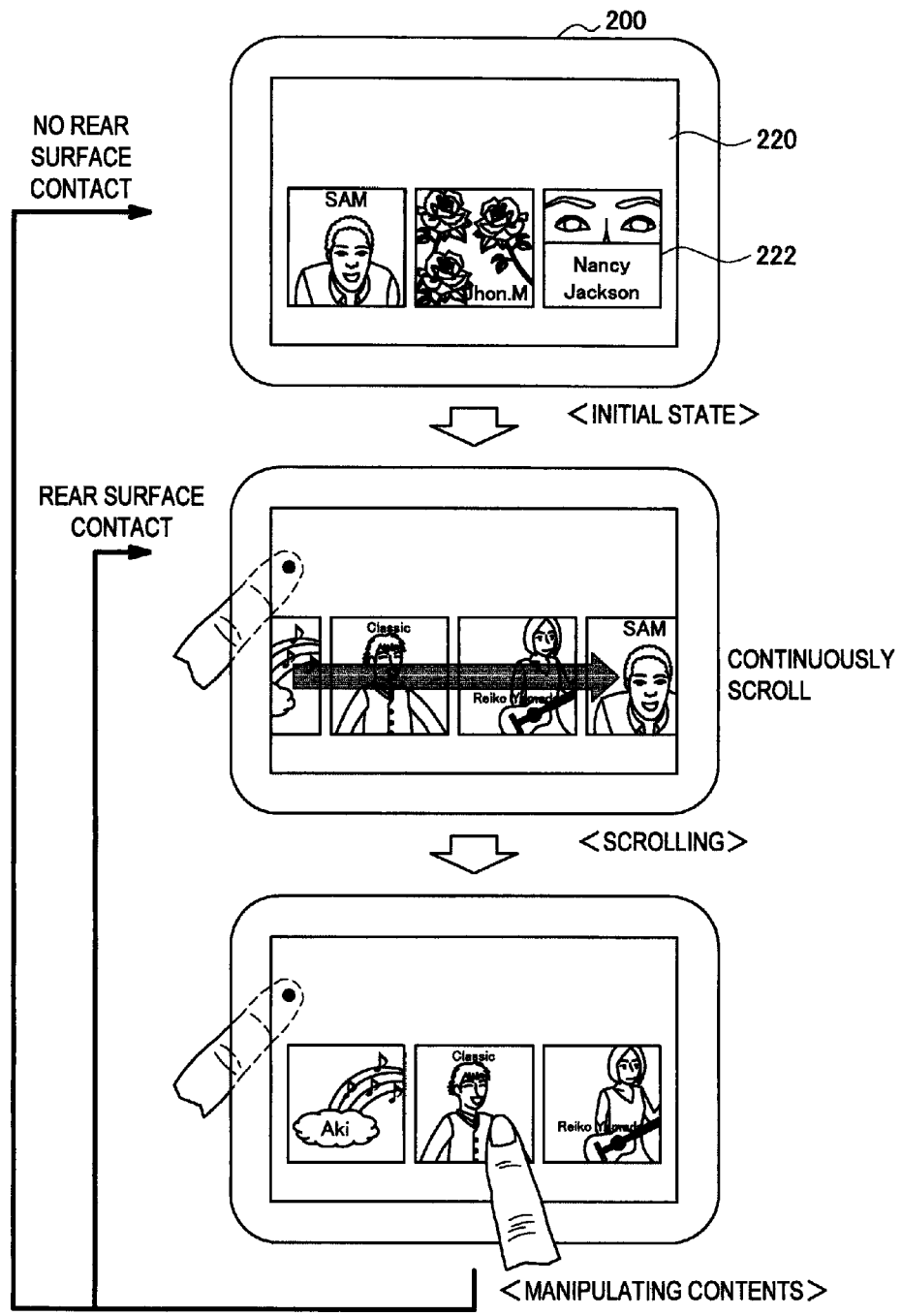
FIG. 20 is an illustrative diagram showing one example of a process based on a flow of the process shown in FIG. 19.
Figure 21:
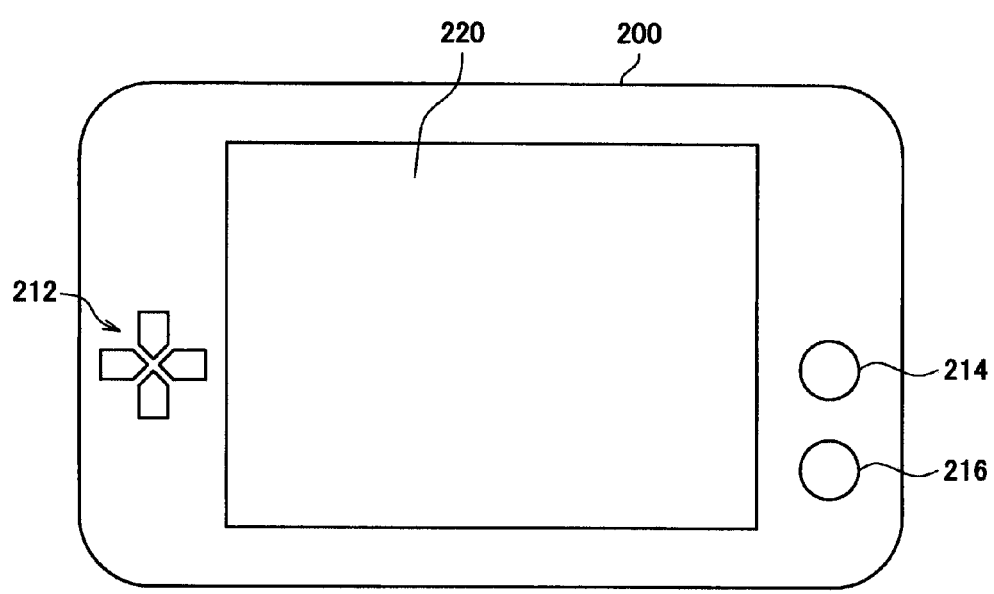
FIG. 21 is a schematic plan view showing one example of a configuration of an information processing terminal according to the second embodiment.
Figure 22:
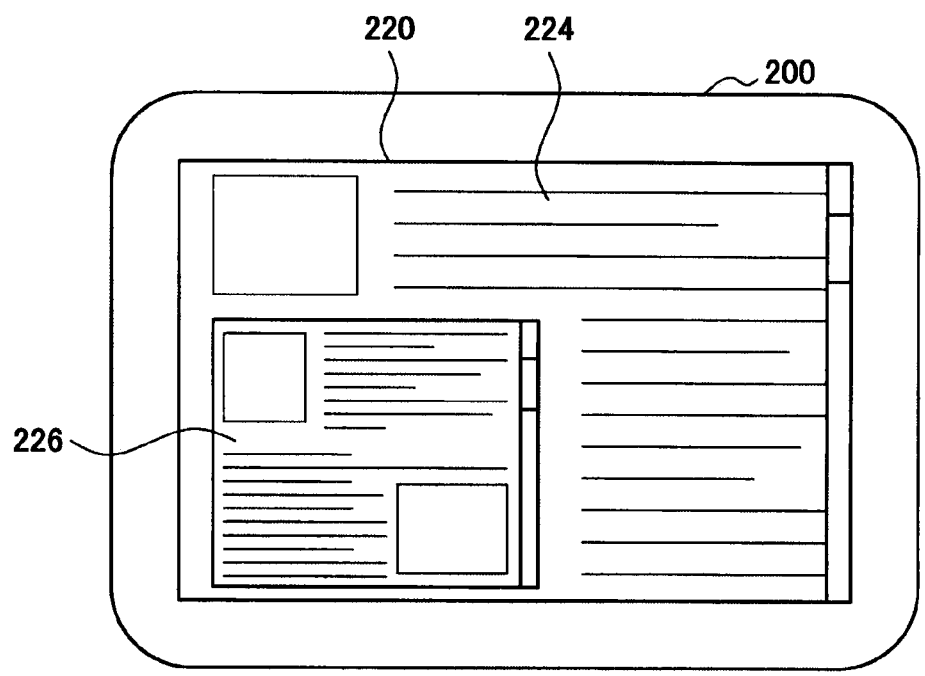
FIG. 22 is an illustrative diagram showing an example of one screen display to which an execution process determination based on a priority in the execution processing unit according to the second embodiment is applied.

Hereinafter, a configuration and a function of the information processing terminal 200 according to the present embodiment will be described in detail. FIG. 16 is a block diagram illustrating one example of a hardware configuration of the information processing terminal 200 according to the present embodiment. FIG. 17 is a functional block diagram showing functions of the information processing apparatus 240 according to the present embodiment. FIG. 18 is a flowchart showing a flow of an execution process determination based on a priority in the execution processing unit 244 according to the present embodiment. FIG. 19 is a flowchart showing a flow of an execution process determination based on a priority in the execution processing unit 244 according to the present embodiment, in which the process is paused. FIG. 20 is an illustrative diagram showing one example of a process based on a flow of the process shown in FIG. 19. FIG. 21 is a schematic plan view showing one example of a configuration of an information processing terminal according to the present embodiment. FIG. 22 is an illustrative diagram showing an example of one screen display to which an execution process determination based on a priority in the execution processing unit 244 according to the present embodiment is applied.

A detailed description of the same configuration and function as those of the first embodiment will be omitted in the following description.

[2-1. Configuration of Information Processing Terminal]

(Example of Hardware Configuration)

The information processing terminal 200 according to the present embodiment includes a CPU 101, a tangibly embodied non-transitory computer-readable storage medium, such as non-volatile memory 102, a RAM (Random Access Memory) 103, a display 104, a rear-surface touch sensor 105, and a front-surface touch sensor 206, for example, as shown in FIG. 16. That is, the information processing terminal 200 according to the present embodiment differs in a hardware configuration from the information processing terminal 100 according to the first embodiment shown in FIG. 3 in that the information processing terminal 200 includes a front-surface input unit, such as touch sensor 206. Accordingly, a description of the CPU 101, the non-volatile memory 102, the RAM 103, the display 104, and the rear-surface touch sensor 105 will be omitted.

The front-surface touch sensor 206 is one of input devices (input manipulation units) that enable a user to input information, similar to the rear-surface touch sensor 105. The front-surface touch sensor 206 is provided to be stacked on a display surface of the display 104 of the information processing terminal 200, and detects contact of manipulation bodies such as forgers. The front-surface touch sensor 206 is provided on a surface at an opposite side from the rear-surface touch sensor 105. For example, a capacitive touch panel or a pressure sensitive touch panel may be used as the front-surface touch sensor 206. The front-surface touch sensor 206 includes, for example, an input unit for inputting information, and an input control circuit for generating an input signal based on a user input and outputting the input signal to the CPU 101.

While the information processing terminal 200 according to the present embodiment includes the two touch sensors, this technology is not limited to such an example and the information processing terminal 200 may include three or more touch sensors. While in the present embodiment the touch sensors are provided on the display surface of the display 104 and the rear surface at an opposite side, this technology does not limit installation positions of the touch sensors to such an example. For example, the touch sensors may be provided on both side surfaces of the terminal.

(Functional Configuration)

When the information processing terminal 200 according to the present embodiment simultaneously receives manipulation inputs from a plurality of input units, such as the two touch sensors 105 and 206, the information processing terminal 200 executes a process based on the manipulation inputs, based on priorities previously set for the touch sensors. Such a process may be realized using the information processing apparatus 140 according to the first embodiment.

More specifically, the information processing terminal 200 according to the present embodiment may include an information processing apparatus 240 configured as shown in FIG. 17. That is, the information processing apparatus 240 includes a position detection unit 241, a speed calculation unit 242, a manipulation input judgment unit 243, an execution processing unit 244, an output unit 245, and a setting storage unit 246.

The position detection unit 241 detects contact of a manipulation body with the information processing terminal 200. The information processing terminal 200 according to the present embodiment includes the rear-surface touch sensor 105 and the front-surface touch sensor 206, as shown in FIG. 16. Accordingly, the position detection unit 241 includes a first position detection unit for acquiring position information of fingers on the rear surface from the rear-surface touch sensor 105, and a second position detection unit for acquiring position information of fingers on the front surface from the front-surface touch sensor 206. The position detection unit 241 acquires the detection result for fingers contacting the rear surface and the front surface detected every given time by the touch sensors 105 and 206, and outputs a position of the finger in a detection area of the rear surface and a position of the finger in a detection area of the front surface, as position information, to the speed calculation unit 242.

The speed calculation unit 242 calculates the movement speed of each finger based on the position information input from the position detection unit 241. The speed calculation unit 242 may function, for example, similar to the speed calculation unit 142 according to the first embodiment. The speed calculation unit 242 calculates the movement speed of the finger in contact with the rear surface or front surface based on a history of the position information of the finger and outputs the movement speed to the manipulation input judgment unit 243.

Based on the movement speed of the finger, the manipulation input judgment unit 243 analyzes a motion of the finger in contact with the rear surface to judge the manipulation input. The manipulation input judgment unit 243 can function, for example, similar to the manipulation input judgment unit 143 of the first embodiment. In this case, the manipulation input judgment unit 243 judges the manipulation input on the rear surface and the manipulation input on the front surface. The manipulation inputs judged by the manipulation input judgment unit 143 are output to the execution processing unit 244.

The execution processing unit 244 issues a command for executing a process according to the manipulation input of the user judged by the manipulation input judgment unit 243. The execution processing unit 244 issues a command corresponding to the manipulation input based on execution process information stored in a setting storage unit that will be described later. Further, when manipulation inputs are simultaneously received from the rear surface and the front surface, the execution processing unit 244 according to the present embodiment judges according to which of the manipulation inputs to execute a process. The execution processing unit 244 makes the judgment based on the priorities of the touch sensors stored in the setting storage unit 246. Thus, a command for executing a process corresponding to a manipulation input having a higher priority is issued by the execution processing unit 244.

The output unit 245 is a functional unit for outputting information to provide the information to the user and corresponds to, for example, the display 104 of FIG. 16. The output unit 245 may be, for example, a speaker, a vibration generation unit, a lamp, or the like, as in the first embodiment.

The setting storage unit 246 is a storage unit for storing information necessary to perform command issuing according to the manipulation input. For example, the setting storage unit 246 corresponds to the non-volatile memory 102 or the RAM 103 of FIG. 16. For example, execution process information in which manipulation inputs are associated with issued commands, priorities assigned to manipulation input units such as a plurality of touch sensors, and the like are stored in the setting storage unit 246. Further, group information or speed or angle information necessary for a grouping process, time information necessary for a flick manipulation judgment process, and the like are stored in the setting storage unit 246.

While the information processing apparatus 240 according to the present embodiment has been described as judging the manipulation input and issuing the command, similar to the first embodiment, this technology is not limited to such an example. The information processing apparatus 240 according to the present embodiment may be an apparatus capable of detecting a plurality of manipulation inputs. The information processing apparatus 240 may detect a plurality of manipulation inputs using a scheme other than the grouping process or the manipulation input judgment process described in the first embodiment.

[2-2. Information Processing in Information Processing Apparatus]

Next, a flow of determining an execution process in the information processing apparatus 240 according to the present embodiment will be described with reference to FIG. 18. As shown in FIG. 18, first, the manipulation input judgment unit 243 detects a manipulation input from the manipulation input unit provided in the information processing terminal 200 based on the detection result of the position detection unit 241 (S210). Step S210 may be performed based on, for example, the process of steps S110 to S150 of FIG. 7 in the first embodiment.

When the manipulation input is detected, the execution processing unit 244 judges whether a plurality of manipulation inputs are detected (S212). The judgment in step S212 may be performed based on, for example, whether there are inputs from two or more of a plurality of position detection units constituting the position detection unit 241 or the number of manipulation inputs judged by the manipulation input judgment unit 243. If it is determined in step S212 that the number of the manipulation inputs is 1, the execution processing unit 244 issues a command for executing a process corresponding to the manipulation input (S214), and the process ends. On the other hand, if it is determined in step S212 that there are a plurality of manipulation inputs, the execution processing unit checks priorities assigned to the manipulation input units, which are stored in the setting storage unit 246 (S216).

The priorities assigned to, for example, manipulation input units provided in positions where it is easier for the user to intentionally perform a manipulation input may be set to be higher. In other words, the priority of the manipulation input unit provided in a position where the user's finger is highly likely to be unintentionally brought into contact is set to be lower. Specifically, for the front surface at the display surface side of the display 104 and the rear surface at an opposite side, it is easier for the user to perform a manipulation input and it is possible for the user to more accurately input information on the front surface in comparison with the rear surface. Accordingly, a higher priority is assigned to the front-surface touch sensor 206, than the rear-surface touch sensor 105. By setting such priorities, a process based on a manipulation input intended by the user can be preferentially executed and an erroneous manipulation can be prevented.

When the priority of the manipulation input unit in which each manipulation input has been performed has been checked in step S216, the execution processing unit 244 issues a command to execute a process corresponding to a manipulation input performed in the manipulation input unit having the highest priority (S218), and the process ends.

The flow of determining the execution process based on the priorities in the information processing apparatus 240 according to the present embodiment has been described above.

(Pause of Process Executed by Previous Manipulation Input)

Here, when a command according to a manipulation input having the highest priority is issued in step S218 of FIG. 18, the execution processing unit 244 may issue a command according to only one manipulation input by forcibly canceling commands according to other manipulation inputs. Alternatively, when the other manipulation input is being continuously performed before the manipulation input having the highest priority ends, execution of a process according to the other manipulation input may be paused and then may be executed after the manipulation input having the highest priority ends. Such a process will be described with reference to FIGS. 19 and 20.

As shown in FIG. 19, first, only a first manipulation input from a first manipulation input unit is assumed to have been detected by the manipulation input judgment unit 243 (S220). The execution processing unit 244 executes a process based on the first manipulation input while only the first manipulation input is being detected (S221). Then, a second manipulation input from a second manipulation input unit is assumed to have been detected while the first manipulation input is being continuously performed (S222). When the first manipulation input and the second manipulation input are simultaneously detected as in this case, the execution processing unit 244 acquires a priority of the first manipulation input and a priority of the second manipulation input from the setting storage unit 246 and compares the priorities to each other to judge a higher priority (S223).

If it is judged in step S223 that the priority of the second manipulation input is higher than the priority of the first manipulation input, the execution processing unit 244 pauses the process corresponding to the first manipulation input (S224), and issues a command to execute a process corresponding to the second manipulation input (S225). Accordingly, the process corresponding to the first manipulation input is temporarily not performed, and the process according to the second manipulation input having a higher priority is executed.

Then, a judgment is made at given timing as to whether the second manipulation input is continuously performed (S226). When there is the second manipulation input, the process from step S224 is repeated. On the other hand, if it is judged in step S226 that the second manipulation input ends, the execution processing unit 224 ends the process corresponding to the second manipulation input (S227). The execution processing unit 224 judges whether the first manipulation input is continuously performed (S228). If the first manipulation input is continuously performed, the execution processing unit 224 releases the pause of the process corresponding to the first manipulation input (S229). On the other hand, if the first manipulation input has already ended in step S228, the process paused in step S224 ends and the process shown in FIG. 19 ends.

Returning to the process of step S223, if it is judged that the priority of the first manipulation input is higher than the priority of the second manipulation input, the process based on the second manipulation input is not executed and the process corresponding to the first manipulation input is continuously executed (S230).

One concrete example of the process shown in FIG. 19 is shown in FIG. 20. In FIG. 20, an object list of a plurality of objects 222 in which respective contents are associated is displayed on the display unit 220 of the information processing terminal 200. The object list can be scrolled according to the manipulation input from the rear surface. Further, each object 222 in the object list can be manipulated according to the manipulation input from the front surface.

In this case, a finger is brought into contact with the rear surface in order to scroll the object list in a given direction from an initial state of FIG. 20. If the contact of the finger with the rear surface is detected by the information processing apparatus 240, the object list is gradually scrolled in a given direction, and when a given time elapses, the object list is scrolled at a certain speed (during scrolling). Then, when contact of the finger with the front surface is detected during scrolling, the execution processing unit 244 acquires the priorities of the rear-surface touch sensor 105 and the front-surface touch sensor 206 by referencing the setting storage unit 246 and judges based on which of the manipulation inputs to execute a process.

Here, a manipulation input of the front-surface touch sensor 206 provided in a position where it is easy for the user to view and manipulate may be considered to be intentionally performed by the user, unlike a manipulation input from the rear-surface touch sensor 105. Accordingly, in this example, the priority of the front-surface touch sensor 206 is set to be higher than the priority of the rear-surface touch sensor 105. Accordingly, the execution processing unit 244 pauses scrolling of the object list, such that the objects in the object list can be manipulated according to the manipulation input from the front surface (during content manipulation).

Then, when the user releases the finger from the front surface, the execution processing unit 244 judges whether the finger is still in contact with the rear surface. If the finger is in continuous contact with the rear surface, the execution processing unit 244 scrolls the paused object list at a certain speed again. Accordingly, it is possible to scroll the object list at a certain speed without waiting for a given time, which reduces a user manipulation load. On the other hand, if the finger in contact with the rear surface has already been released when the user releases the finger from the front surface, the execution processing unit 244, for example, may return the object list to the initial state or keep the object list in a display state at a time when the finger is released from the front surface.

[2-3. Others]

(Setting of Priority according to Configuration of Manipulation Input Unit)

While in the above description, the manipulation input unit in which the manipulation input is performed is the rear-surface touch sensor 105 or the front-surface touch sensor 206, this technology is not limited to such an example. For example, the manipulation input unit may be a nontouch-sensitive hardware input unit such as direction keys 212 for moving a manipulation target up, down, left and right, input buttons 214 and 216 for instructing execution of a given process, an analog joystick (not shown), or the like, as shown in FIG. 21.

Even in this case, when a plurality of manipulation inputs are detected from the manipulation input unit, the execution processing unit 244 determines one executed process based on previously set priorities without depending on a software or hardware configuration. For example, since an input using a hardware input unit is considered to have been intentionally performed by the user in comparison to the touch sensor, a priority of the nontouch-sensitive hardware input unit may be set to be higher than that of the touch-sensitive sensor.

(When one executed process is determined based on priority)

While, in the above description, only one process is executed based on the previously set priority and other processes are forcibly ended or paused when a plurality of manipulation inputs are detected, this technology is not limited to such an example. For example, when a plurality of manipulation inputs are detected, one executed process may be determined based on the priorities only when the processes corresponding to the respective manipulation inputs conflict with each other when executed.

For example, when all of information 224 displayed on the display unit 220 of the information processing terminal 200 is difficult to display in the display area, a scroll bar is displayed so that the information 224 displayed in the display area can be moved, as shown in FIG. 22. The first information 224 may be moved, for example, by performing a scroll manipulation by causing the finger to be brought into contact with the rear surface. On the other hand, the second information 226 is included in the first information 224, and the second information 226 is displayed in a given area of the first information 224. Since all of the second information 226 is difficult to display in the given area, a scroll bar is also displayed so that the second information 226 can be moved. The second information 226 may be moved, for example, by performing a scroll manipulation by causing the finger to be brought into contact with the front surface.

In such a case, when scroll manipulations are simultaneously performed on the rear surface and the front surface and if one executed process is not determined based on the priority as in the present embodiment, the first information 224 and the second information 226 are scrolled together. Accordingly, information whose movement is unintended by the user is moved and it is difficult for the user to confirm intended information. Thus, when a plurality of manipulation inputs are detected and if the processes corresponding to the respective manipulation inputs conflict with each other when executed, a malfunction can be prevented by the information processing apparatus 240 according to the present embodiment.

On the other hand, even when a plurality of manipulation inputs are detected, processes corresponding to the manipulation inputs may be executed in parallel if the processes do not conflict with each other when executed.

The configuration and the function of the information processing terminal 200 according to the second embodiment have been described above. According to the present embodiment, when a plurality of manipulation inputs are detected, only one process having a high priority is executed based on the priority set for the manipulation input unit in which the manipulation input has been performed. Accordingly, it is possible to execute the process according to a user's intention and to prevent an erroneous manipulation.

Moreover, the present technique is not limited to such examples set forth above. While in the above embodiments, the position of the manipulation body, such as a finger, in the detection area is detected by the contact with the detection area using the touch sensor, this technology is not limited to such an example. For example, the position of the manipulation body may be acquired using proximity sensors in place of the touch sensors.

It should be understood by those skilled in the art that various modifications, combinations, sub-combinations and alterations may occur depending on design requirements and other factors insofar as they are within the scope of the appended claims or the equivalents thereof. Also, any reference in the claims to articles, such as "a" or "an," is to be construed as meaning "one or more."

Additionally, the present technology may also be configured as below.

(1) An apparatus comprising:
a speed calculation unit configured to calculate a movement speed of a plurality of operating members based on input data corresponding to input operations of the operating members;
a manipulation input analysis unit configured to analyze the input data based on the movement speed; and
an execution unit configured to generate a command for executing a process according to the analyzed input data.

(2) The apparatus of (1), comprising a processing unit configured to receive input data corresponding to the input operations from a plurality of input units.

(3) The apparatus of (1) or (2), wherein the generated command corresponds to an input operation of one of the operating members.

(4) The apparatus of (1) to (3), comprising a grouping processing unit configured to classify the plurality of operating members into groups based on the input data.
(5) The apparatus of (4), wherein the plurality of operating members are classified according to at least one of position, movement direction, movement speed, area of contact, shape of contact, contact pressure, or proximity of the operating members to each other.
(6) The apparatus of (4) or (5), wherein the grouping processing unit is configured to define a reference vector corresponding to an operating member having a highest movement speed from among the plurality of operating members.
(7) The apparatus of (6), wherein the grouping processing unit is configured to classify, as a group, operating members having movement parameter in common with the reference vector.
(8) The apparatus of (7), wherein the movement parameter is a movement direction within a threshold angle of a direction of the reference vector, or a movement speed within a threshold amount of a speed of the reference vector.
(9) The apparatus of (7) or (8), wherein the grouping processing unit is configured to exclude operating members based on a lack of a common movement parameter with the reference vector.
(10) The apparatus of (7) to (9), wherein the grouping processing unit is configured to
classify, as a group, operating members having a movement parameter related by a predetermined function to a corresponding movement parameter of the reference vector.
(11) The apparatus of (4) to (10), wherein the manipulation input analysis unit is configured to determine a manipulation operation based on positional relationships and movement parameters of the groups.
(12) The apparatus of (11), wherein the manipulation operation comprises at 15 least one of a pinch-out operation, a pinch-in operation, a rotation operation, a scrolling operation, or a zooming operation.
(13) The apparatus of (11) to (12), wherein the manipulation input analysis unit is configured to determine a manipulation operation based on averaging the movement parameters of the operating members in the group.
(14) A method comprising:
calculating a movement speed of a plurality of operating members based on input data corresponding to input operations of the operating members;
analyzing the input data based on the movement speed; and
generating a command for executing a process according to the analyzed input data.
(15) A tangibly embodied non-transitory computer-readable storage medium storing instructions which, when executed by a processor, cause a computer to perform a method, comprising:
calculating a movement speed of a plurality of operating members based on input data corresponding to input operations of the operating members;
analyzing the input data based on the movement speed; and
generating a command for executing a process according to the analyzed input data.
(16) An apparatus comprising:
speed calculation means for calculating a movement speed of a plurality of operating members based on input data corresponding to input operations of the operating members;
manipulation input analysis means for analyzing the input data based on the movement speed; and
execution means for generating a command for executing a process according to the analyzed input data.

What is claimed is:
1. An apparatus comprising:
at least one processor;
a speed calculation unit configured to calculate a movement speed of a plurality of operating members based on input data corresponding to input operations of the operating members using the at least one processor;
a manipulation input analysis unit configured to analyze the input data based on the movement speed using the at least one processor;
an execution unit configured to generate a command for executing a process according to the analyzed input data using the at least one processor; and
a grouping processing unit configured to classify the plurality of operating members into groups based on the input data using the at least one processor, wherein the grouping processing unit is configured to define a reference vector corresponding to an operating member having a highest movement speed from among the plurality of operating members.
2. The apparatus of claim 1, comprising a processing unit configured to receive input data corresponding to the input operations from a plurality of input units using the at least one processor.
3. The apparatus of claim 1, wherein the generated command corresponds to an input operation of one of the operating members.
4. The apparatus of claim 1, wherein the plurality of operating members are classified according to at least one of position, movement direction, movement speed, area of contact, shape of contact, contact pressure, or proximity of the operating members to each other.
5. The apparatus of claim 1, wherein the grouping processing unit is configured to classify, as a group, operating members having movement parameter in common with the reference vector.
6. The apparatus of claim 5, wherein the movement parameter is a movement direction within a threshold angle of a direction of the reference vector, or a movement speed within a threshold amount of a speed of the reference vector.
7. The apparatus of claim 5, wherein the grouping processing unit is configured to exclude operating members based on a lack of a common movement parameter with the reference vector.
8. The apparatus of claim 5, wherein the grouping processing unit is configured to classify, as a group, operating members having a movement parameter related by a predetermined function to a corresponding movement parameter of the reference vector.
9. The apparatus of claim 1, wherein the manipulation input analysis unit is configured to determine a manipulation operation based on positional relationships and movement parameters of the groups.
10. The apparatus of claim 9, wherein the manipulation operation comprises at least one of a pinch-out operation, a pinch-in operation, a rotation operation, a scrolling operation, or a zooming operation.
11. The apparatus of claim 9, wherein the manipulation input analysis unit is configured to determine a manipulation operation based on averaging the movement parameters of the operating members in the group.
12. A method comprising:
calculating a movement speed of a plurality of operating members based on input data corresponding to input operations of the operating members;
analyzing the input data based on the movement speed;

generating a command for executing a process according to the analyzed input data; and classifying the plurality of operating members into groups based on the input data to define a reference vector corresponding to an operating member having a highest movement speed from among the plurality of operating members.

13. A tangibly embodied non-transitory computer-readable storage medium storing instructions which, when executed by a processor, cause a computer to perform a method, comprising:

calculating a movement speed of a plurality of operating members based on input data corresponding to input operations of the operating members;

analyzing the input data based on the movement speed;

generating a command for executing a process according to the analyzed input data; and classifying the plurality of operating members into groups based on the input data to define a reference vector corresponding to an operating member having a highest movement speed from among the plurality of operating members.

14. An apparatus comprising at least one processor:

speed calculation means for calculating a movement speed of a plurality of operating members based on input data corresponding to input operations of the operating members using the at least one processor;

manipulation input analysis means for analyzing the input data based on the movement speed using the at least one processor;

execution means for generating a command for executing a process according to the analyzed input data using the at least one processor; and grouping processing means for classifying the plurality of operating members into groups based on the input data using the at least one processor, wherein the grouping processing means defines a reference vector corresponding to an operating member having a highest movement speed from among the plurality of operating members.

15. The method of claim 12, wherein the classifying classifies, as a group, operating members having movement parameter in common with the reference vector.

16. The method of claim 15, wherein the movement parameter is a movement direction within a threshold angle of a direction of the reference vector, or a movement speed within a threshold amount of a speed of the reference vector.

17. The method of claim 15, wherein the classifying excludes operating members based on a lack of a common movement parameter with the reference vector.

18. The method of claim 15, wherein the classifying classifies, as a group, operating members having a movement parameter related by a predetermined function to a corresponding movement parameter of the reference vector.

19. The method of claim 12, comprising determining a manipulation operation based on positional relationships and movement parameters of the groups, wherein the manipulation operation comprises at least one of a pinch-out operation, a pinch-in operation, a rotation operation, a scrolling operation, or a zooming operation.

20. The method of claim 12, comprising determining a manipulation operation based on positional relationships and movement parameters of the groups, wherein the manipulation operation is based on averaging the movement parameters of the operating members in the group.

* * * * *